United States Patent [19]

Kuwabara et al.

[11] Patent Number: 5,015,347
[45] Date of Patent: May 14, 1991

[54] ELECTROLYTIC FINISHING METHOD

[75] Inventors: Youhei Kuwabara; Haruki Sugiyama, both of Fukuroi, Japan

[73] Assignee: Shizuoka Seiki Co., Ltd., Shizuoka, Japan

[21] Appl. No.: 453,878

[22] Filed: Dec. 20, 1989

[30] Foreign Application Priority Data

Dec. 26, 1988 [JP] Japan .................. 63-328555
Jan. 24, 1989 [JP] Japan .................... 1-14431
Jan. 28, 1989 [JP] Japan .................... 1-17869

[51] Int. Cl.$^5$ ................. B23H 3/10; B23H 3/00
[52] U.S. Cl. ................. 204/129.2; 204/129.43; 204/129.5
[58] Field of Search .......... 204/129.2, 129.25, 129.43, 204/129.5

[56] References Cited

U.S. PATENT DOCUMENTS

| | | | |
|---|---|---|---|
| 3,944,390 | 3/1976 | Lieber | 204/129.2 X |
| 4,456,516 | 6/1984 | Schaffner | 204/129.25 X |
| 4,541,909 | 9/1985 | Fromson | 204/129.2 |
| 4,814,052 | 3/1989 | Konietzni et al. | 204/129.2 |

FOREIGN PATENT DOCUMENTS

| | | | |
|---|---|---|---|
| 63-114815 | 5/1988 | Japan . | |
| 0618234 | 6/1978 | U.S.S.R. | 204/129.2 |
| 0852482 | 8/1981 | U.S.S.R. | 204/129.2 |
| 1342639 | 10/1987 | U.S.S.R. | 204/129.2 |
| 1014313 | 12/1965 | United Kingdom | 204/129.25 |
| 1093932 | 12/1967 | United Kingdom | 204/129.25 |

Primary Examiner—Donald R. Valentine
Attorney, Agent, or Firm—Armstrong, Nikaido, Marmelstein, Kubovcik & Murray

[57] ABSTRACT

An electrode is positioned to form a predetermined gap between the electrode and a surface of a work, and the electrode and the work are submerged in an electrolyte. Thereafter pulses are applied to the electrode, and clean electrolyte is supplied to the gap. A theoretical number of machining passes necessary for obtaining a desired machining depth is set and an actually machining of on the surface of the work is carried out in accordance with the theoretical number is the depth of cut measured. The theoretical number of machining is then changed, based on the measured cut depth. Machining is further performed in accordance with the changed theoretical number of machining.

7 Claims, 21 Drawing Sheets

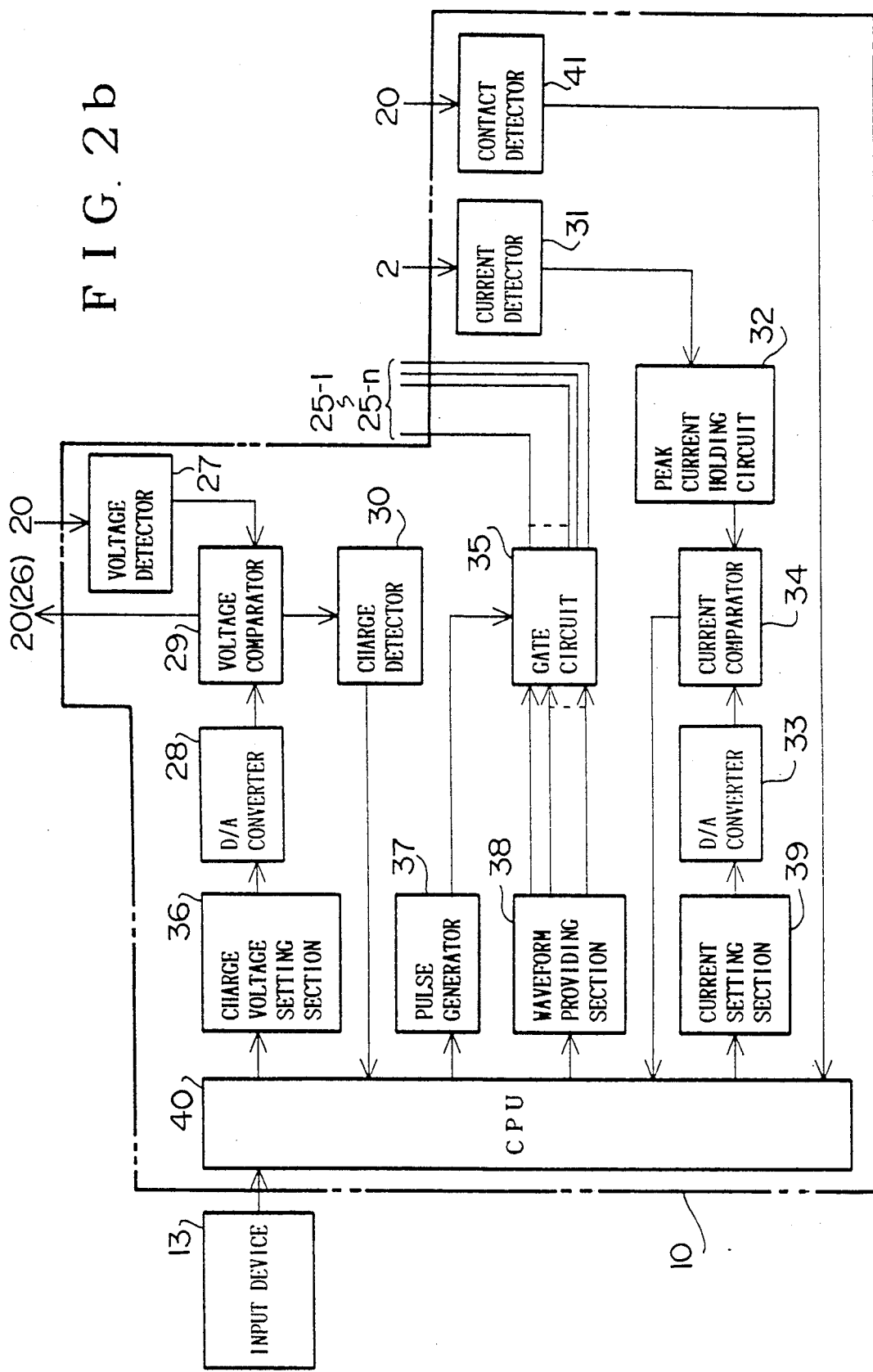

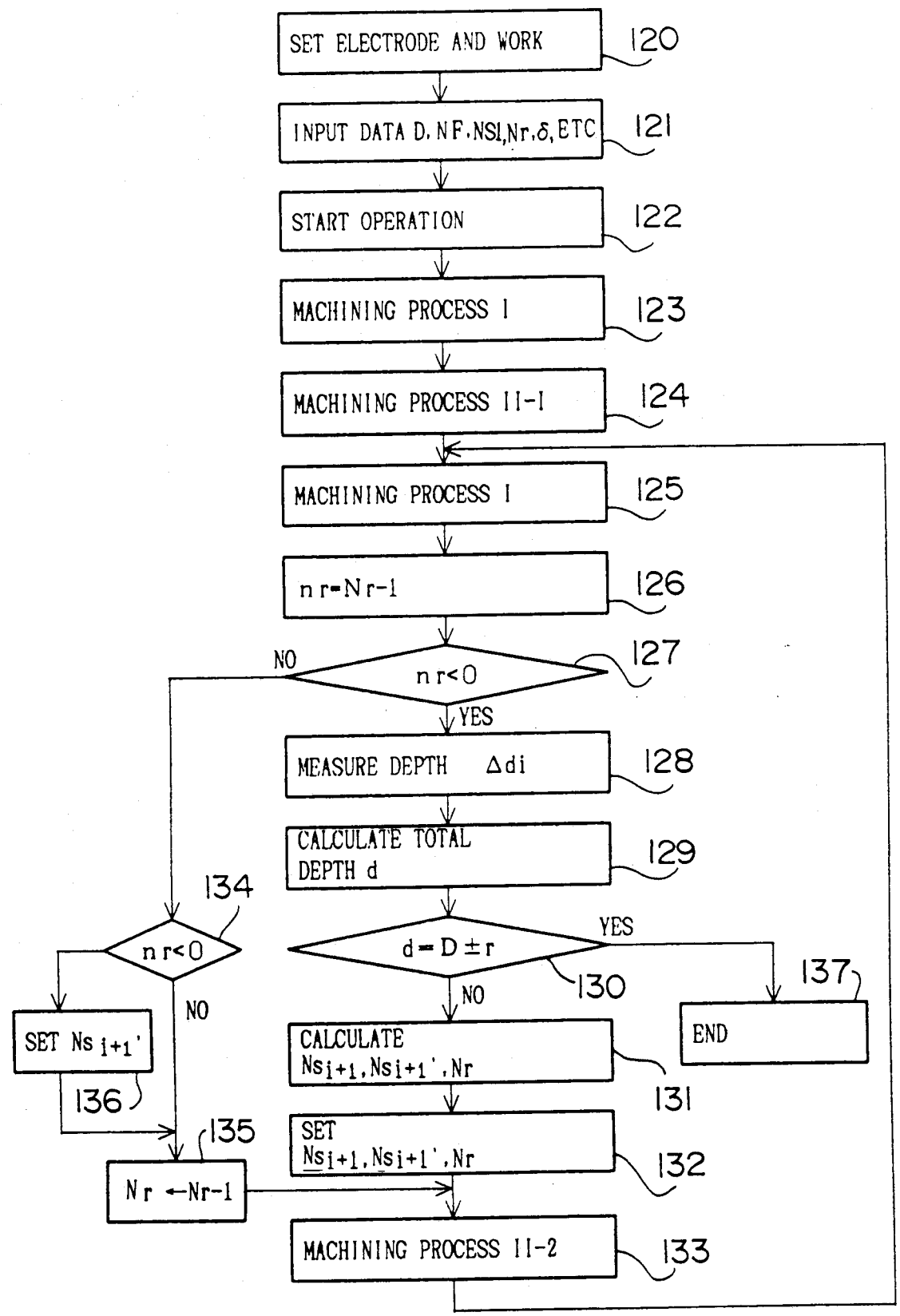
F I G. 19

ELECTROLYTIC FINISHING METHOD

BACKGROUND OF THE INVENTION

The present invention relates to a method for finishing a surface of a work by electrolytic machining, and more particularly to a method for accurately controlling the machining depth.

Japanese Patent Application Laid-Open 63-114815 discloses a method for finishing a work machined by electrolytic machining. In the method, the work which is secured in an electrolyte tank is positioned to form a predetermined gap between an electrode and the surface of the work. A pulse is applied to the electrode in stationary liquid electrolyte, and then clean electrolyte is intermittently supplied to the gap, discharging the electrolyte including residual products.

In the method, a desired machining depth of the work necessary to obtain the required surface roughness of the work without deteriorating the roughness obtained through the electrolytic machining is calculated in dependency on data acquired by experiments and trials. The quantity of coulombs required to machine a unit of area to a desired machining depth is calculated based on an equation which relates the electrochemical equivalent for the particular work material and the current efficiency determined by experiments.

If the machine finishing is carried out under the same conditions as the experiments, the dimensions of the finished surface is in a small range within +5% of the desired dimensions. However, owing to the difference of the concentration, temperature and pH of the electrolyte from that of the experiment, it is difficult to machine the work under the same conditions, Moreover, the shape of the surface of the work is too complicated to accurately calculate the surface area thereof, causing an error in the calculation. The error affects the calculation of the quantity of coulomb per area unit, so that the machining accuracy is impaired.

In addition, it is difficult to flush the liquid electrolyte through the gap between the work and the electrode in the same manner as the experiments. As a result, residual products in the gap cannot be effectively and uniformly removed, deteriorating machining efficiency, particularly so in a work with a complicated surface. Thus, the actually machined depth becomes smaller than the desired depth, and hence it is impossible to produce accurate products.

SUMMARY OF THE INVENTION

The object of the present invention is to provide an electrolytic finishing method which is adapted to finish a surface of a workpiece with accuracy.

According to the present invention, there is provided a method for finishing a workpiece including securing the work in an electrolytic tank, positioning an electrode to form a predetermined gap between the electrode and the surface of the work, supplying electrolyte to the electrolyte tank so as to submerge the electrode and the work, applying pulses to the electrode, supplying clean electrolyte to the gap and discharging the electrolyte including residual products.

The method comprises setting a desired machining depth, theoretically determining a first theoretical number of machining passes necessary for obtaining the desired machining depth, performing a first predetermined number of machining passes on of the work by a predetermined number, measuring the cut depth actually machined on the surface of the workpiece after the actual number of machining passes reaches said predetermined number, establishing a new number of machining passes based on said measured cut depth, to provide a second theoretical number of machining, passes necessary to achieve said desired machining depth and performing a second number of machining passes of the workpiece based on said second number of machining passes.

In one aspect of the invention, the predetermined number of machining passes is equal to the first theoretical first number of machining passes.

The other objects and features of this invention will be better understood from the following description with reference to the accompanying drawings.

BRIEF DESCRIPTION OF DRAWINGS

FIGS. 2a and 2b are block diagrams showing a system for supplying current to an electrode and a work;

FIGS. 19 and 20 are flowcharts showing the operations of an eighth and ninth embodiments of the present invention, respectively;

DETAILED DESCRIPTION OF THE PREFERRED EMBODIMENTS

Figure 1:
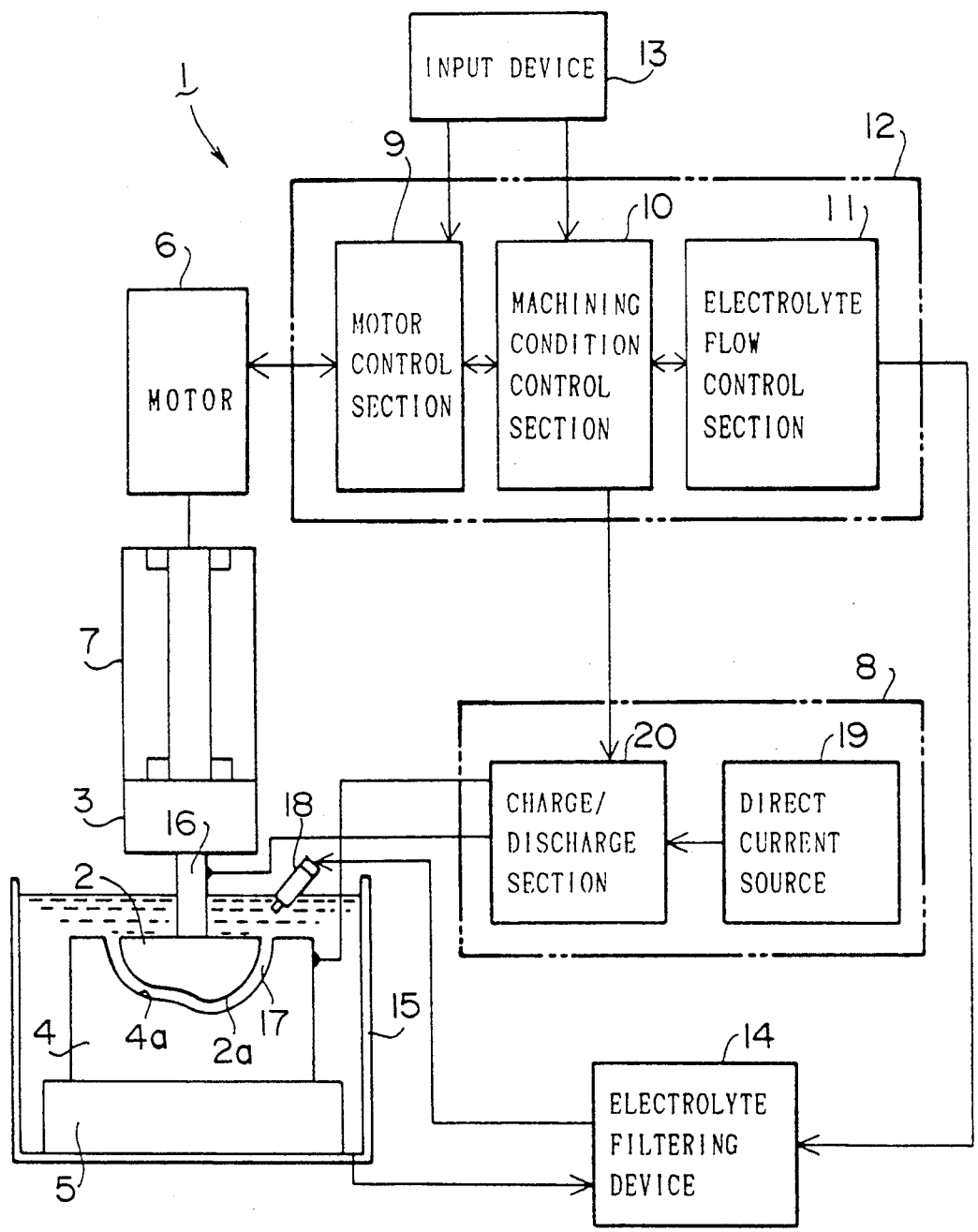
FIG. 1 is a schematic illustration showing a system of an electrolytic finishing machining according to the present invention.

Referring to FIG. 1, the electrolytic finishing machine 1 has an electrode holding device 3 for holding an electrode 2, a workpiece fixing device 5 for fixing a workpiece 4 in an electrolyte tank 15. The workpiece fixing device 5 is a table made of insulation, such as granite or ceramic material, and the tank 15 contains electrolyte, such as sodium nitrate solution. The electrode 2, made of copper or graphite, is secured to the lower end of a rod 16 of an electrode holding device 3. The holding device 3 is operatively connected to a servo motor 6 through an electrode driving direction converter 7. The converter 7 is arranged to change rotary output of the motor 6 into axial movement of the rod 16.

The workpiece 4 has a three-dimensional recess 4a to be finished, which has been formed by an electrical discharge machine (not shown), with the electrode 2.

The output signal of the motor 6 is supplied to a motor control section 9 of a control unit 12, and the motor 6 is operated by a control signal from the motor control section 9. The control unit 12 has a machining condition control section 10 and an electrolyte flow control section 11.

The system has a source device 8 which comprises a direct current source 19 and a charge/discharge section 20. The charge/discharge section 20 generates a pulse of a current density (specifically a "peak current density") for a pulse duration dependent on the surface area of the recess 4a, in response to a signal from the machining condition control section 10.

The system further has an input device 13 for inputting machining conditions, and an electrolyte filtering device 14 for filtering out residual products in the electrolyte.

The input device 13 is arranged to input various machining condition signals such as the material of the work, surface area of the work, machining depth D, grades of dimension accuracy, surface roughness, number of machining passes N, and initial dimension 6 of the gap 17 between the electrode and the work. The signals are fed to the motor control section 9 and the machining condition control section 10.

The filtering device 14 supplies the electrolyte to the tank 15, in response to an output signal of the electrolyte flow control section 11, at the start of the machining and feeds the electrolyte through a nozzle 18 during the machining so as to remove residual products in the gap 17.

Figure 2A:
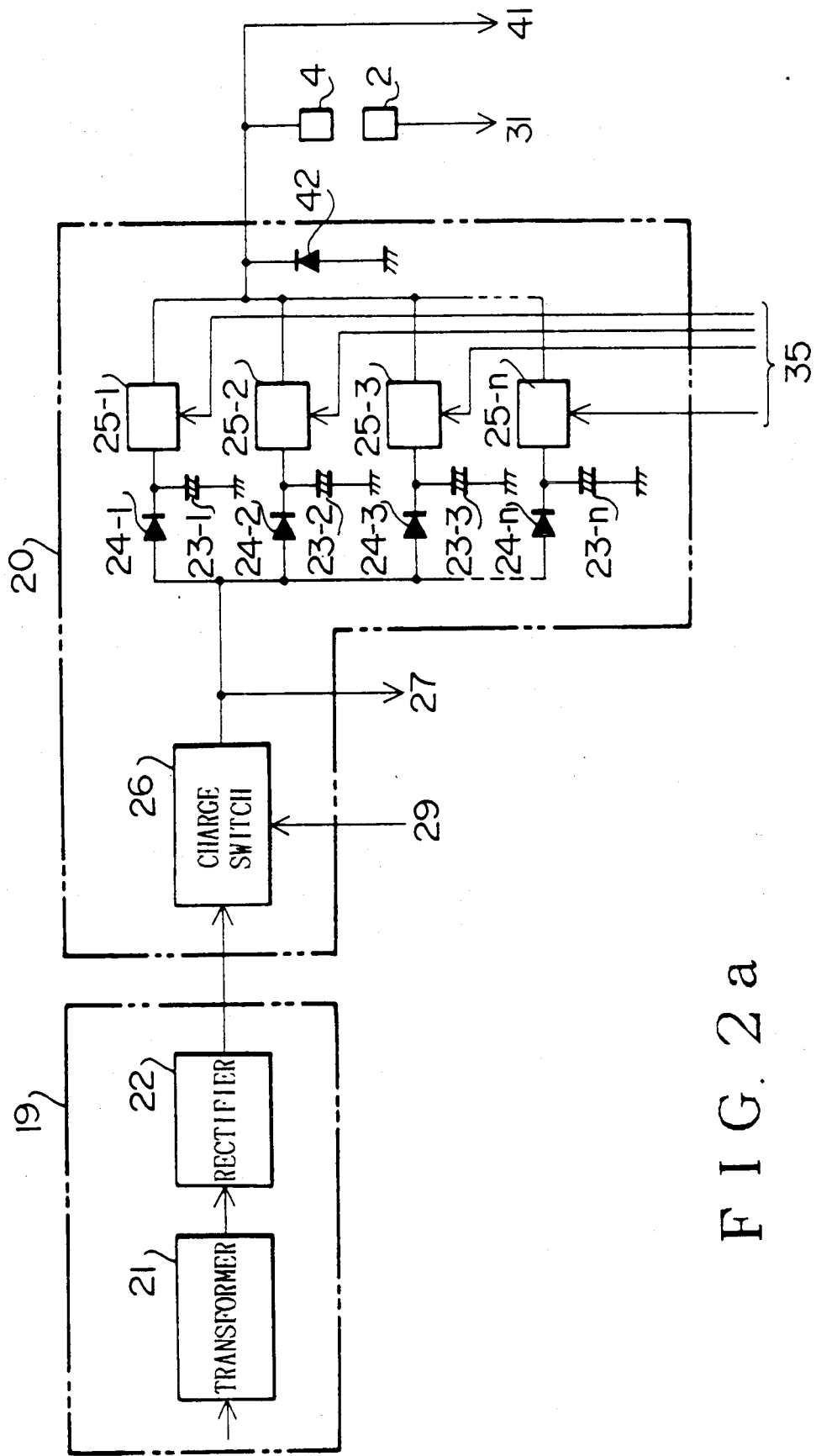

Referring to FIGS. 2a and 2b, the direct current source 19 of the power source device 8 comprises a transformer 21 and a rectifier 22.

The charge/discharge section 20 has a plurality of capacitors 23-1 to 23-n which are connected in parallel with each other, diodes 24-1 to 24-n for preventing reverse current to the current source 19, switches 25-1 to 25-n for generating pulses, and a charge switch 26 responsive to a signal from a voltage comparator 29 for connecting the direct current source 19 to capacitors 23-1 to 23-n to charge each capacitor to a set value.

The machining condition control section 10 comprises CPU 40 applied with signals from the input device 13 to a calculate machining and others, a waveform providing section 38 for providing current waveform to be discharged in the gap 17 between workpiece 4 and the electrode 2, a pulse generator 37 for generating pulses each having a predetermined pulse duration, a charge voltage setting section 36 for setting charge voltage applied to the capacitors 23-1 to 23-n, a current setting section 39, and a D/A converter 33.

A voltage detector 27 is provided for detecting the charge voltage applied to the capacitors 23-1 to 23-n. A voltage comparator 29 is provided for comparing a voltage from a D/A converter 28 corresponding to the charge voltage from the setting section 36 with the charge voltage detected by the voltage detector 27, and a charge detector 30 is provided for detecting the completion of charging in response to the output of the voltage comparator 29. The control section 10 further comprises a current detector 31 for detecting the current of the electric charge discharged between the workpiece 4 and the electrode 2, a peak current holding circuit 32 for holding a peak current detected by the detector 31, a current comparator 34 for comparing the peak current from the peak current holding circuit 32 with the current supplied from the D/A converter 33, a gate circuit 35 for supplying an operation signal to switches 25-1 to 25-n in response to signals from pulse generator 37 and waveform providing section 38, and a contact detector 41 for detecting the contact of the electrode 2 with the workpiece 4. There is provided a diode 42 for preventing the switches 25-1 to 25-n from breaking down by reverse current.

Figure 3:
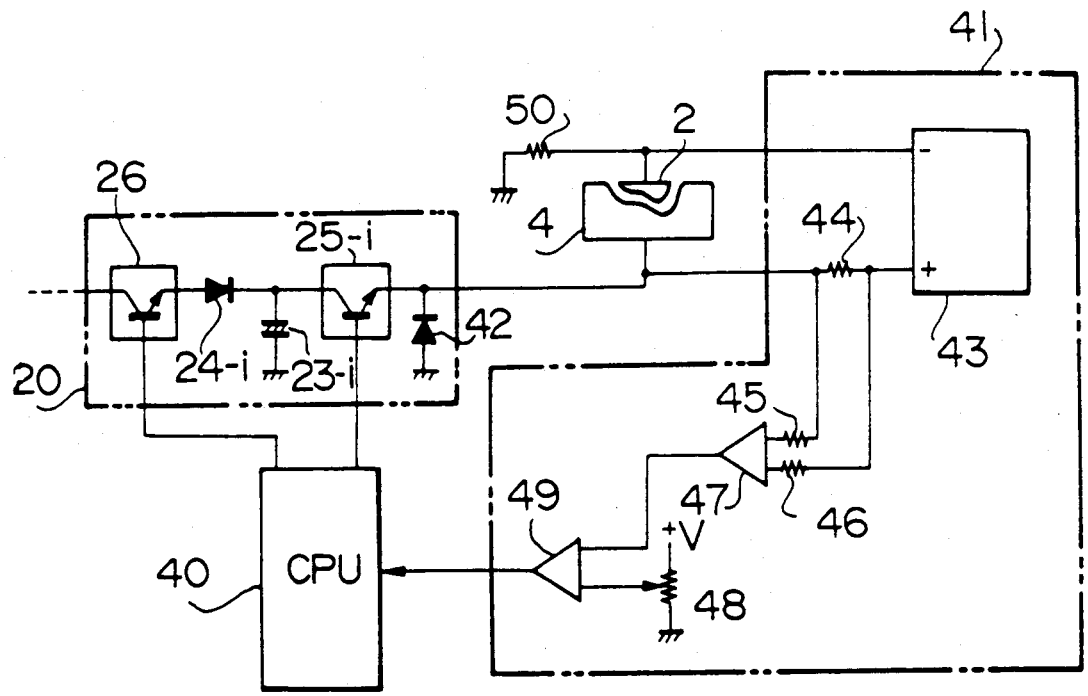
FIG. 3 shows a circuit of a contact detector.

Referring to FIG. 3 the direct current is applied to the charge switch 26 comprising a transistor, the base of which is connected to the CPU 40. The charge switch 26 is controlled in response to the signal from the CPU 40, such that a predetermined charge voltage is applied to the capacitors 23-1 to 23-n through the diodes 24-1 to 24-n.

Each of the switches 25-1 to 25-n of the charge/discharge section 20 comprises a transistor, and the base of each transistor is applied with a signal from the CPU 40 for controlling the discharge of the capacitors 23-1 to 23-n.

The contact detector 41 has a voltage source 43 for supplying a reference voltage lower than a decomposition voltage to the gap 17 between the electrode 2 and the workpiece 4. The decomposition voltage is a voltage at which the electrolysis current begins to flow passing through an electric double layer comprising the workpiece 4, electrolyte and electrode 2. The electrode 2 is connected to ground through a resistor 50 of the current detector 31. A resistor 44 is connected between inputs of an amplifier 47 through resistors 45 and 46. An output of the amplifier 47 is connected to one of the inputs of a comparator 49. The other output is connected to the ground through a variable resistor 48 to provide a reference current corresponding to the resistance thereof. The output of the comparator 49 is connected to the CPU 40 for supplying a contact signal when the current between the electrode 2 and the workpiece 4 is larger than the reference current.

Figure 4:
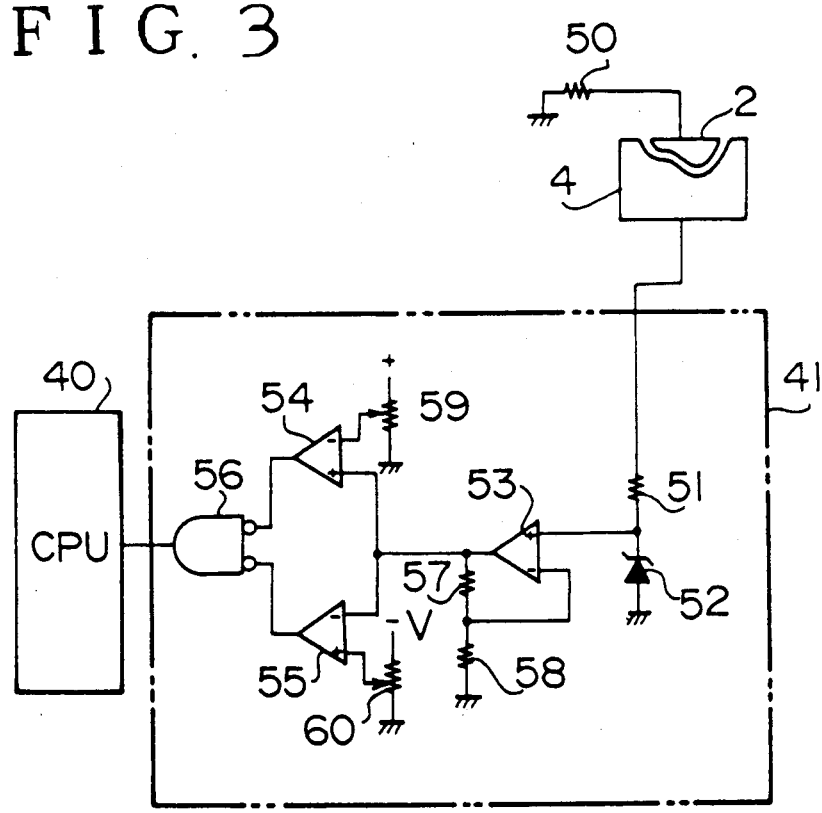
FIG. 4 shows a modification of the contact detector.

FIG. 4 shows a modification of the contact detector 41. The contact detector 41 has an amplifier 53 having a high impedance. A noninverting terminal of the amplifier 53 is connected to the workpiece through a resistor 51 for preventing overvoltage and a zener diode 52 to detect the current between the electrode 2 and the workpiece 4. An inverting terminal of the amplifier 53 is connected to feedback resistors 57 and 58. An output of the amplifier 53 is connected to a noninverting terminal and an inverting terminal of comparators 54 and 55. An inverting terminal of the comparator 54 and a noninverting terminal of the comparator 55 are connected to variable resistors 59 and 60, respectively. The outputs of the comparators 54 and 55 are connected to an AND gate 56 for supplying a logical product of the outputs to the CPU 40. Thus, the voltage between the electrode 2 and the workpiece 4, amplified by the amplifier 53, is fed to the comparators 54 and 55 to be compared with reference voltages +V and −namely, when the voltage is in the range of +V and −V, the AND gate 56 produces a contact signal.

Figure 7:
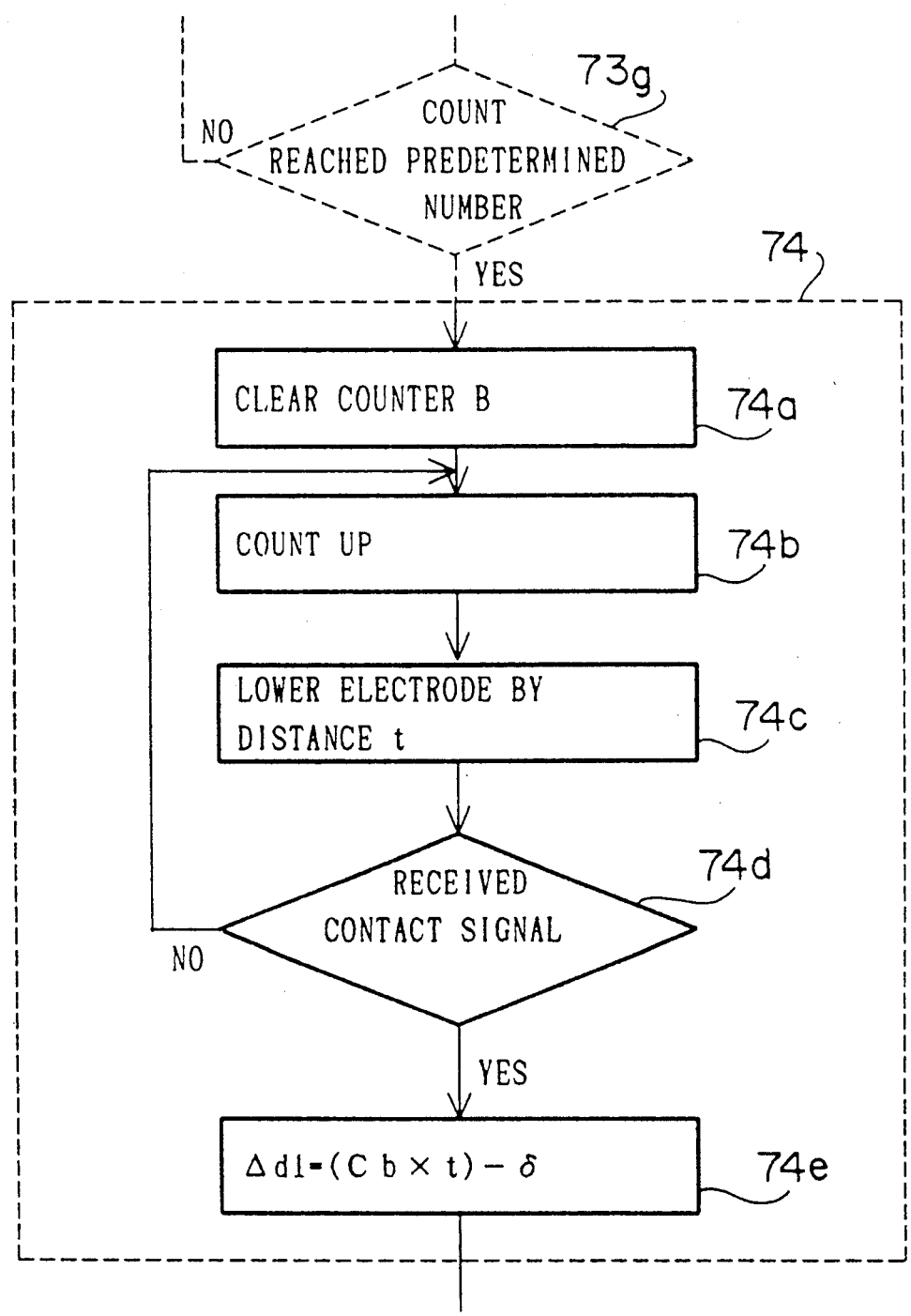
FIG. 7 is a flowchart showing a process for measuring a machining depth in the machining method.
Figure 8:
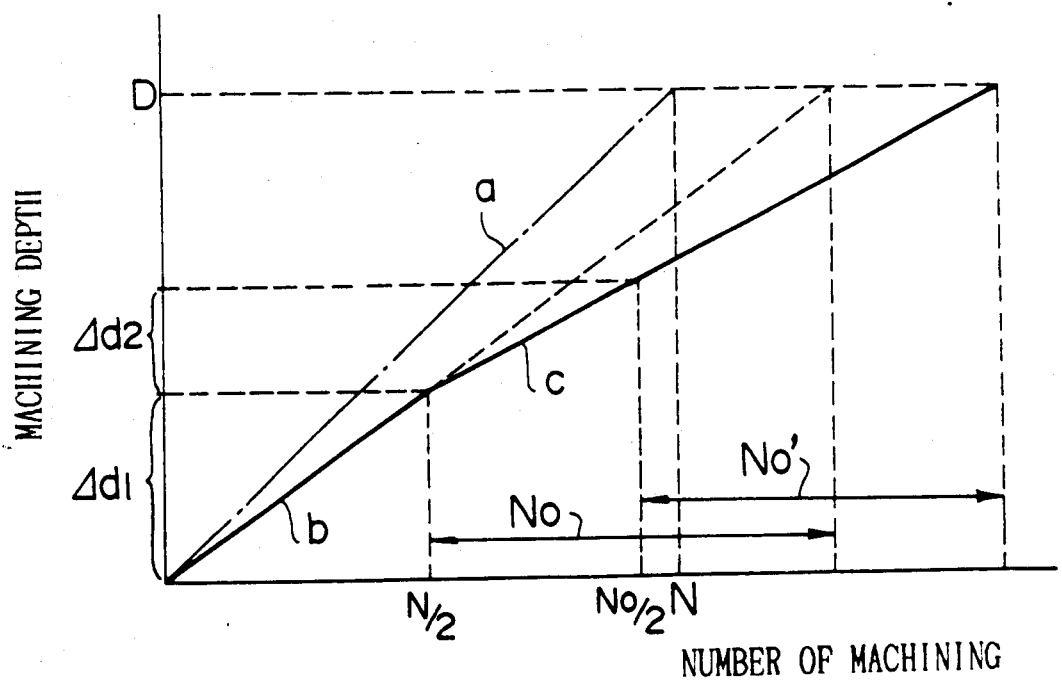
FIG. 8 is a graph showing the relationship between the number of machining passes and the cut (machined) depth.

The method of machine the workpiece is described hereinafter with reference to the flowcharts of FIGS. 5 to 7 and to the graph of FIG. 8. The electrode 2 which was used for electrical discharge machining for roughly machining the workpiece 4 is attached to the rod 16 and the workpiece 4 is attached to the fixing device 5. The position of the workpiece 4 is adjusted to align the recess 4a with an electrode surface 2a (step 70).

At a step 71, machining conditions, such as the dimension δ of electrode gap 17, a desired machining depth D, a theoretical number of machining passes N for obtaining the depth D and others, are input by the input device 13. The theoretical number of machining passes N is calculated based on data obtained from experiments. The electrolyte is supplied to the tank 15 and the operation is started (step 72).

Figure 6:
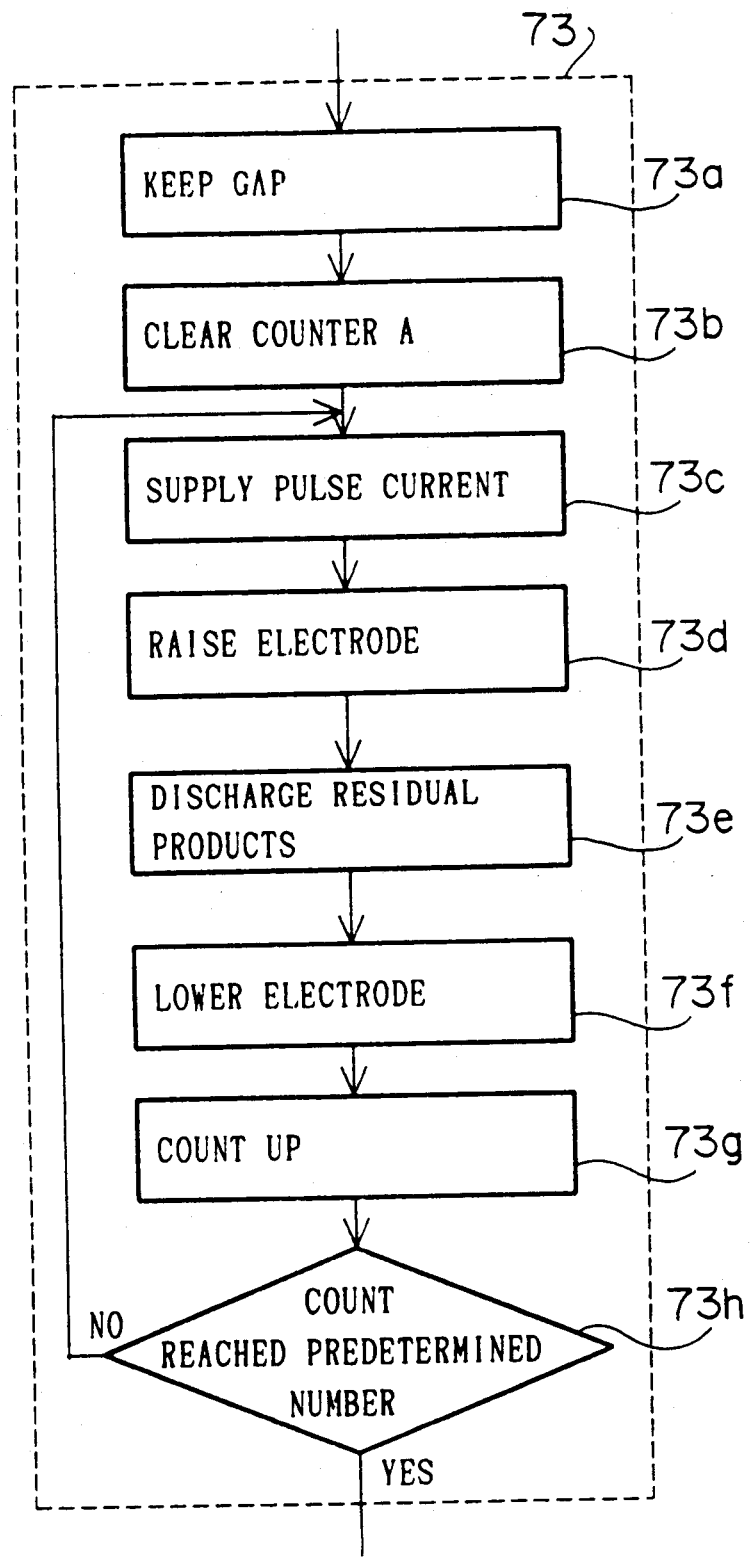
FIG. 6 is a flowchart showing a machining process in the machining method shown in FIG. 5.

An electrolytic machining process (step 73) is described in detail in FIG. 6. The electrode 2 is set to provide the predetermined initial gap δ (step 73a). A counter A which is provided in the CPU 40 is cleared (step 73b). A single pulse current, which has a peak current density ip and a pulse duration P, for improving the surface roughness of the work is applied to the electrode 2 by the source device 8 in response to the signal from the CPU 40 (step 73c).

After the pulse is applied, the electrode 2 is raised by the motor 6 to expand the gap (step 73d). Clean electrolyte is injected through the nozzle 18 to the gap 17, thereby removing the residual products from the gap 17 and the tank 15 (step 73e).

After the discharge of the electrolyte, the electrode 2 is lowered to the initial position (step 73f). At the next step 73g, 1 is added to a count Ca of the counter A and the count Ca is compared with one-half of the predetermined number of machining passes N (N/2). Namely, in the present step, it is determined whether the single pulse current has as yet been supplied for half the number of machining passes N, which was determined at the step 71. The steps 73c to 73g are repeated until the count Ca reaches N/2.

A cut depth Δd1 obtained by machining N/2 times is measured at a step 74 as explained in detail with reference to FIG. 7. A second counter B provided in the CPU 40 is cleared (step 74a), and the counter B is count up (step 74b). The electrode 2 is lowered by a predetermined distance t, for example 1 μm (step 74c), and it is determined whether the electrode 2 has made a contact with the workpiece 4 at the lowered position in dependency on the contact signal from the contact detector 41 (step 74d). When the contact signal is not fed, the program returns to the step 74c so that the electrode 2 is lowered by the distance t at each routine until the contact is made. Thus, the depth Δd1 is calculated as follows at a step 74e.

$$\Delta d1 = (Cb \times t) - \delta$$

where Cb is the count of the counter B.

Figure 5:
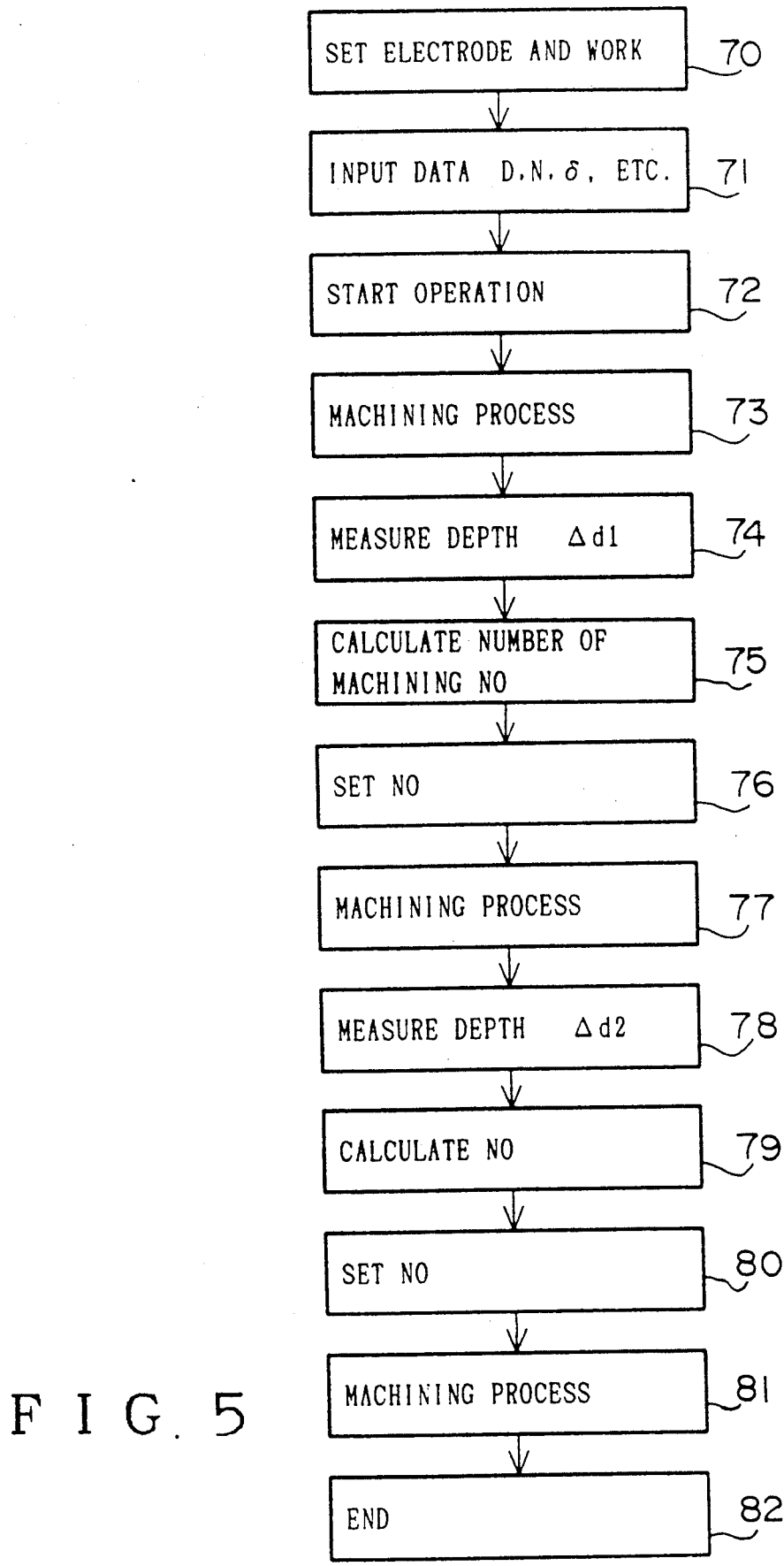
FIG. 5 is a flowchart showing a machining method in a first embodiment.

At a step 75 of FIG. 5, a new number of machining passes NO further required to obtain the desired machining depth D is calculated based on the measured cut depth Δd1 and the number of electrolytic machining passes it took to achieve this cut depth. Although the number of machining passes N is calculated so as to increase the cut depth along the dot-dash line a shown in FIG. 8, the actually cut depth in operation is usually smaller as shown by a line b. Therefore, the new number of machining passes NO is estimated based on the number of machining passes N/2 and the actual depth Δd1 obtained by machining for N/2 passes. Since $$\Delta d1 \times NO = N/2 \times (D - \Delta d1),$$

$$NO = N(D - \Delta d1)/2 \cdot \Delta d1$$

The calculated number of machining passes NO is fed to the CPU 40 through the input device 13 at a step 76 and the machining process described in FIG. 6 is carried out accordingly (step 77). That is, at the step 77, the number of machining passes with which the count Ca is compared is now NO/2. A depth Δd2 is obtained by machining NO/2 times as shown by a line c in FIG. 8. The depth Δd2 is measured at step 78 in the same procedure as the step 74. Thereafter, a further new number of machining NO' is calculated in accordance with the machined depth Δd2. Namely, $$\Delta d2 \times NO' = NO/2 \times (D - \Delta d2 - \times d1)$$

Therefore, $$NO' = \frac{N(D - \Delta d1)(D - \Delta d2 - \Delta d1)}{4 \cdot \Delta d1 \cdot \Delta d2}$$

The number of machining passes NO' is input at a step 80 and the machining is performed at a step 81 in the same manner as the steps 73 and 77. This time, the machining is performed for NO' times and the machining is finished (step 82).

The first embodiment may be modified so that the cut depth Δdi is measured each time when the work is machined a predetermined number of machining passes, for example at every time of the pulse application. Furthermore, a plurality of pulses may be applied to the electrode 2 at a time. Although the electrode 2 is lowered in order to measure the cut depth alternatively, the workpiece 4 may be raised when measuring the cut depth.

Figure 9:
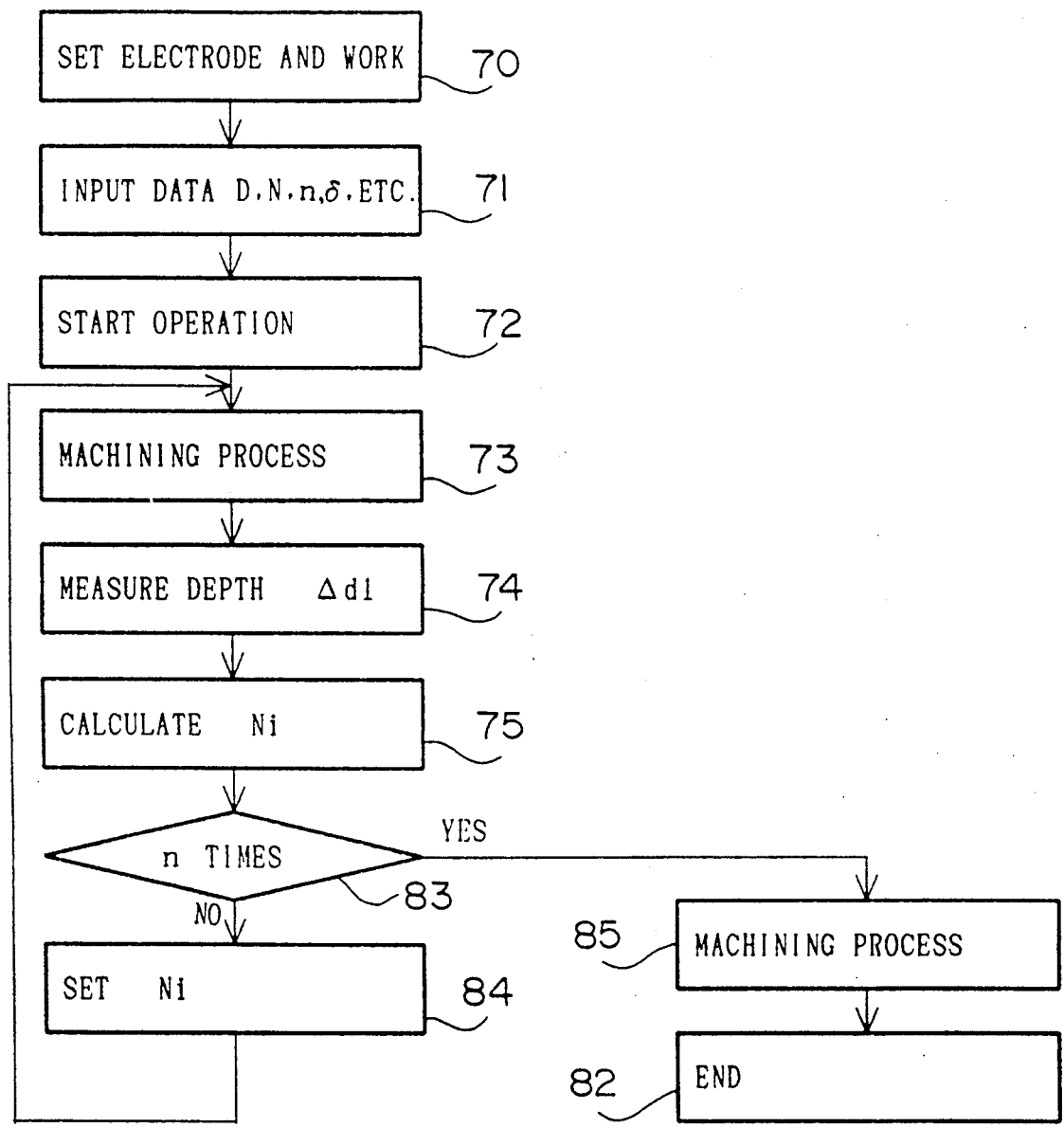
FIGS. 9 and 10 are flowcharts showing the operations of second and third embodiments of the present invention, respectively.

FIG. 9 shows a flowchart of a second embodiment of this second present invention. In the embodiment, the cut depth Δdi is measured as a predetermined number n. The number n is input into the CPU 40 along with the desired machining depth D, predetermined number of machining passes N and the gap dimension Δ at the step 71. When the machining is repeated N/2 times, at the step 73 and the depth Δdi is measured, a new number of machining passes Ni further required to obtain the depth D is calculated at the step 75. At a step 83, it is determined whether the depth Δdi has been achieved. When the answer is no, a new calculated number of machining passes Ni based on the actual depth of machining achieved, is input into the CPU 40 at a step 84 and the machining process is repeated. When the depth Δdi is calculated n times, the work is machined Ni times at a step 85, which was set at the last routine. Thus, the machining is completed (step 82).

Figure 11:
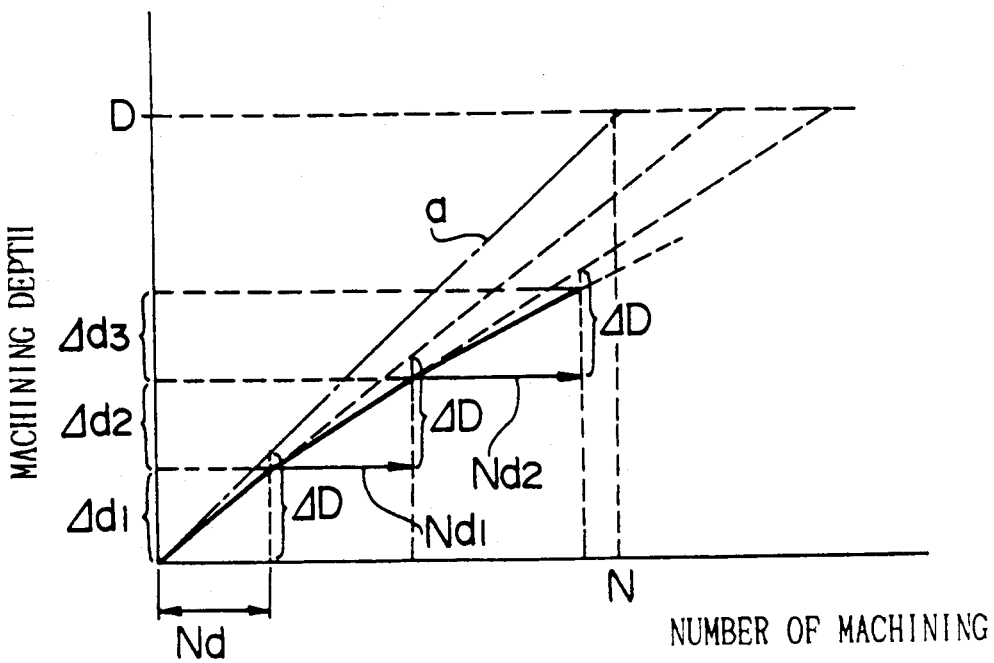
FIG. 11 is a graph showing the relationship between the number of machining passes and the cut depth in the third embodiment.
Figure 10:
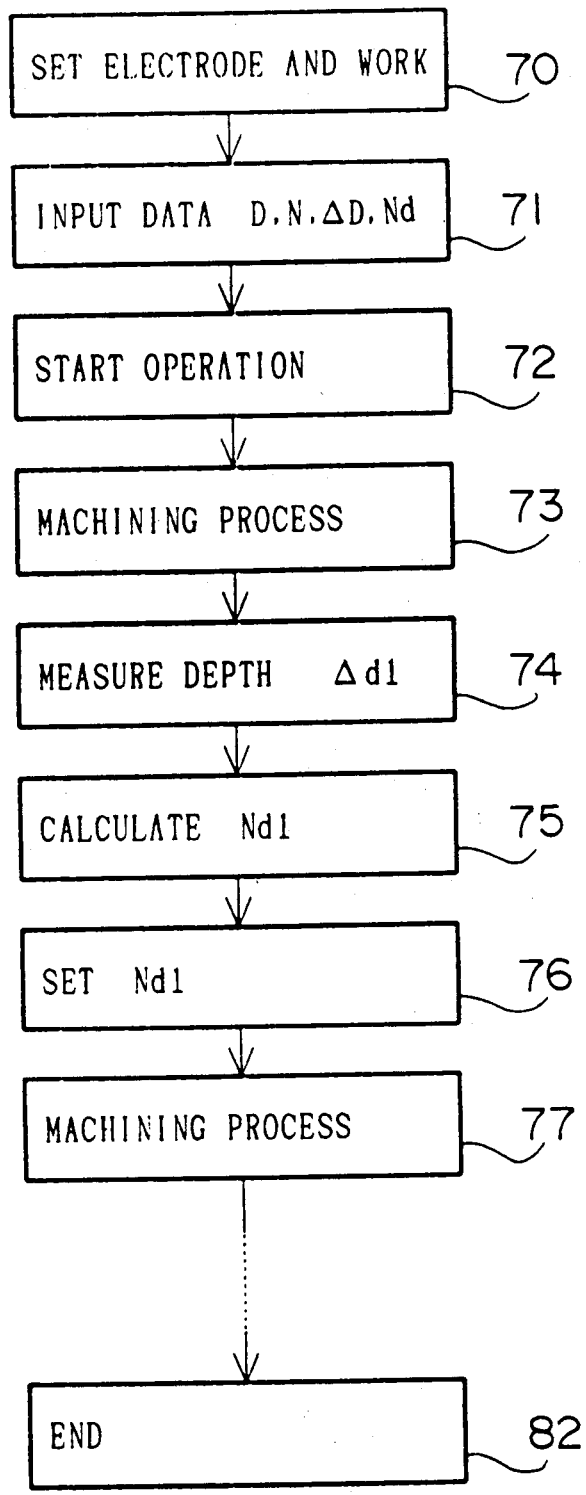

Referring to FIGS. 10 and 11, a third embodiment of the present invention is characterized in that the number of machining passes Nd for machining a predetermined desired incremental machining depth $\Delta D$, for example 1 $\mu$m, which is smaller than the overall machining depth D, is calculated at the step 71. The incremental machining depth $\Delta D$ and the number of machining passes Nd necessary for obtaining the depth $\Delta D$ are input in addition to the machining depth D and the corresponding number of machining passes N. When the machining is performed Nd times (step 73), the cut depth $\Delta d1$ is measured (step 74). The number of machining passes $Nd_1$ for obtaining the remainder of the desired depth $\Delta D$ is calculated in depending on the actually cut depth $\Delta d1$ at a step 75. Namely, as shown in a graph of FIG. 11, $$Nd \times \Delta D = \Delta d1 \times x\, Nd_1,$$

$$Nd_1 = \Delta D \times Nd / \Delta D$$

In the following routines, the number of machining passes $Nd_i$ for i-th machining is calculated as follows.

$$Nd_1 = \Delta D \times Nd_{i-1} / \Delta di$$

The number of machining passes $Nd_1$ is accordingly input at a step 76. The other operations are the same as in the first and second embodiments.

Figure 12:
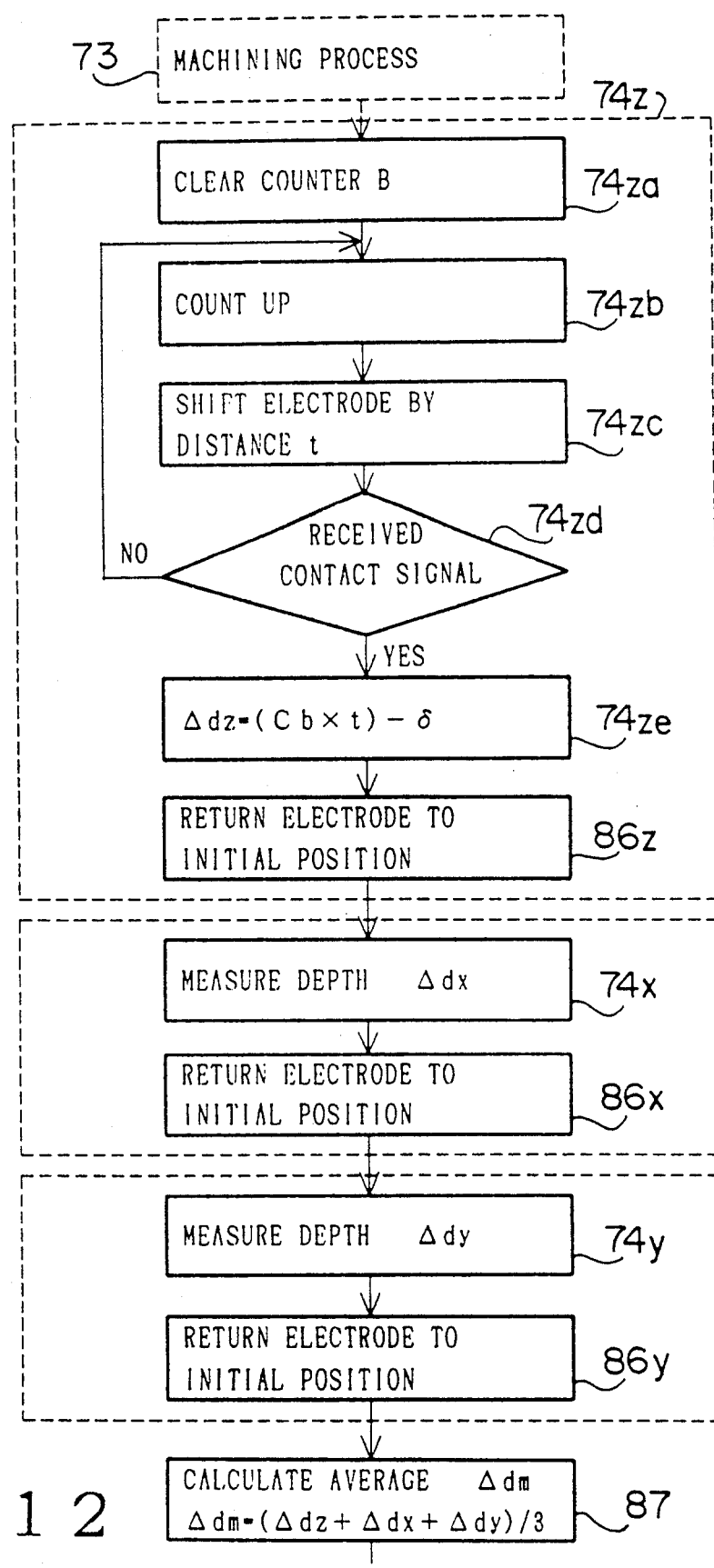
FIG. 12 is a process of flowchart showing a measuring a cut depth in a fourth embodiment of the present invention.

FIG. 12 shows a part of a flowchart of a fourth embodiment of the present invention. In this embodiment, steps 74z to 87 are carried out instead of the steps described in FIG. 7 so that the cut depth $\Delta di$ of workpiece 4 is measured not only in the vertical direction (Z-axis) but also in other directions (X-axis and Y-axis). When the machining process at the step 73 is finished, a depth $\Delta dz$ on the Z-axis, that is, the vertical axis, is calculated. The electrode 2 is lowered by the distance t until it makes a contact with the workpiece 4. The electrode 2 returns to the initial position at a step 86z after the depth $\Delta dz$ is calculated by an equation $\Delta dz = (Cb \times t) - \Delta$. A depth $\Delta dx$ in the X-axis direction and a depth $\Delta dy$ in the Y-axis direction are thereafter measured in the same manner (steps 74x, 74y). Whenever the depth in any of the directions is calculated, the electrode 2 returns to the initial position (steps 86z, 86x, 86y). An average $\Delta dm$ ($\Delta dm = (\Delta dx + \Delta dy + \Delta dz)/3$) of the depths $\Delta dx$, $\Delta dy$, $\Delta dz$ is calculated at a step 87. The number of machining passes is calculated based on the average $\Delta dm$. Since depths are measured across the whole surface of the three-dimensional recess 4a of the workpiece 4, the workpiece 4 is accurately machined. The depth in another direction, such as rotational direction about the Z-axis, may be further measured.

Figure 13:
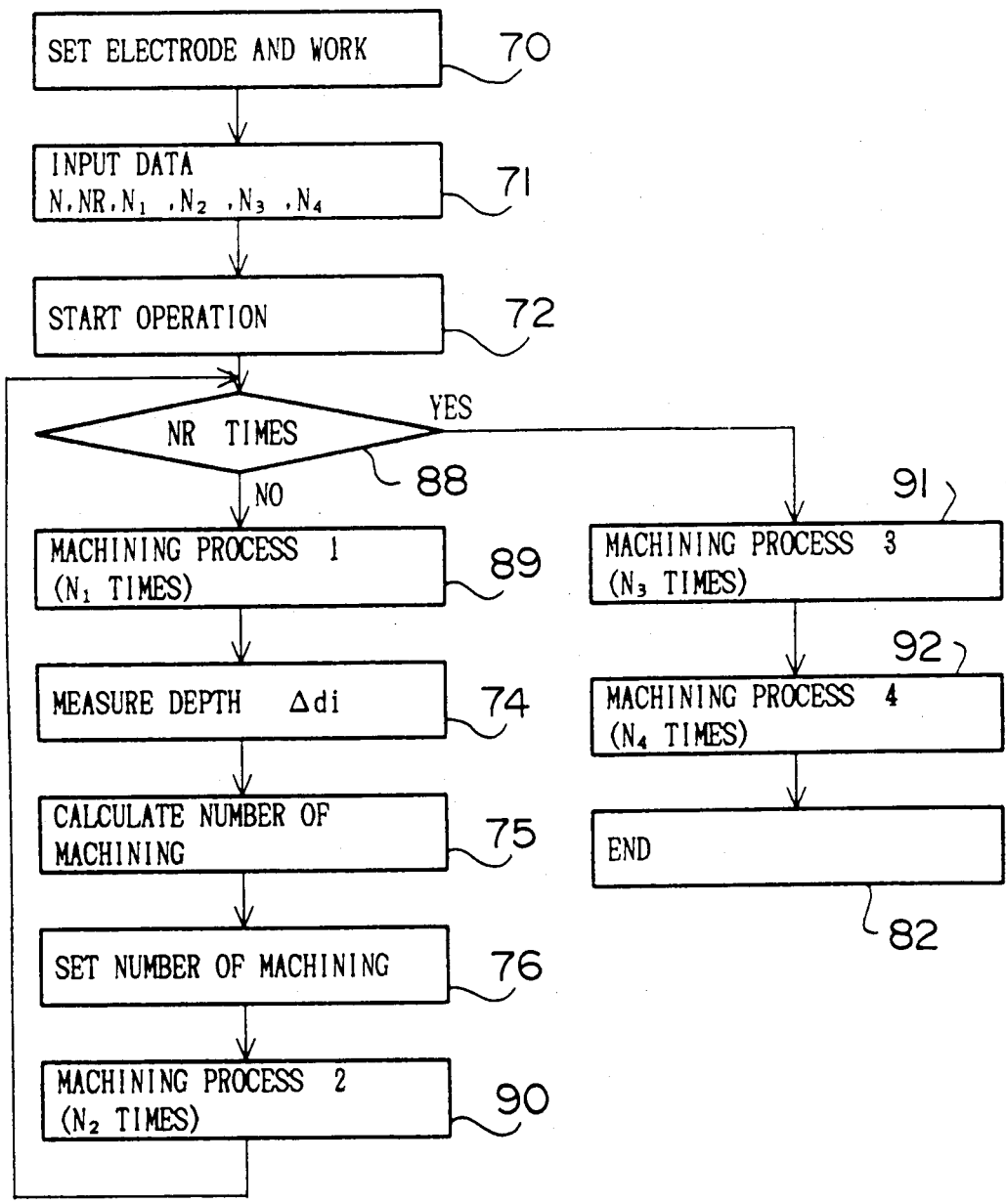
FIGS. 13 and 14 are flowcharts showing the operations of a fifth and sixth embodiments, respectively.

The fifth embodiment described in FIG. 13 is applied to a machining operation where a finishing process is carried out under four different conditions. At the step 71, a predetermined number of machining N1 passes to N4 for each of the machining passes processes 1 to 4 and the number of machining NR, which is the sum of the number of machining passes carried out in processes 1 and 2 are input. When the machining operation is started (step 72), it is determined whether the number of machining passes is below the number NR (step 88). In the first routine, since the number of machining passes is zero, the machining process 1 where the work is machined N1 times, is carried out (step 89) and the number of machining passes N2d is calculated based on the cut depth $\Delta di$ measured at the step 74. The machining process 2 is performed in dependency on the calculated number N2d (step 90). The process of steps 89 to 90 is repeated until the work is machined NR times. Thereafter, the finishing processes 3 and 4 are carried out at steps 91 and 92, respectively. The number of machining passes calculated at the step 75 may be the total through out the finishing processes 1 to 4, or the total of the processes 1 and 2, or each of the process 1 to 4.

FIGS. 14 to 22 show embodiments of the present invention applied to a machining operation including different finishing processes I and II where the workpiece 4 is machined under different conditions. In the finishing process I, removing pulse current is applied to the electrode for removing an oxide film, including electrolytic products formed on the workpiece 4, in the course of the finishing process II so as to provide a lustrous surface. A peak current density $ip_1$ of the removing pulse current is 30 to 50 A/cm$^2$ and pulse duration $P_1$ is more than 20 msec. In the finishing process II, a finishing pulse current for improving the surface roughness is applied. The pulse current having a peak current density $ip_2$ of 30 to 50 A/cm$^2$ and a pulse duration $P_2$ less than 10 msec is fed 5 times with a pulse interval of 100 to 500 msec. The current may be a single pulse current as in the finishing process I.

Figure 14:
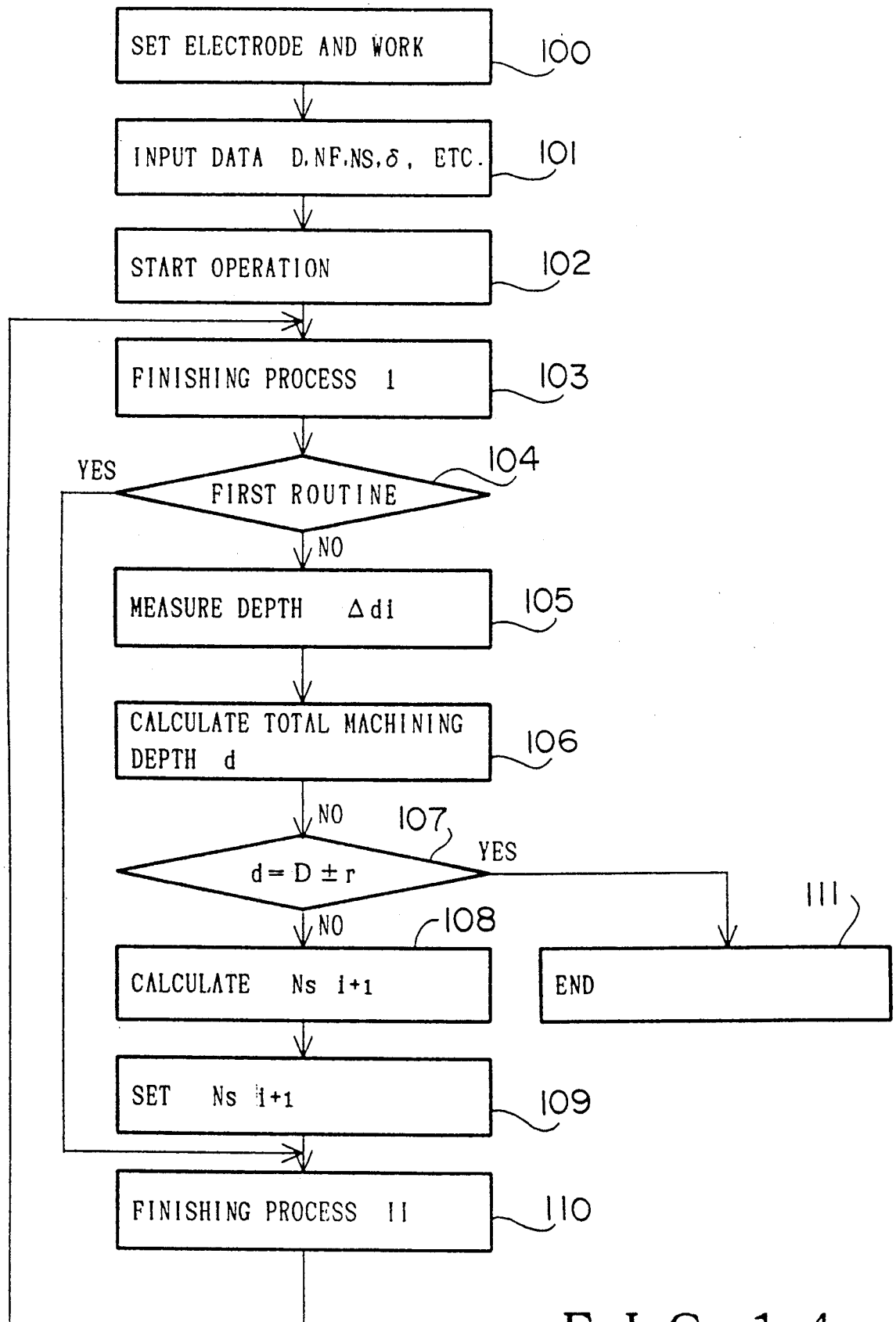

In a sixth embodiment shown in FIG. 14, the electrode 2 and the workpiece 4 are set on the electrolytic finishing machine 1 (step 100) and data are input in the CPU 40 (step 101) so that the operation is started (step 102). The input data are: total machining depth D, initial gap dimension $\Delta$, number of machining passes NF for the finishing process I, initial number of machining passes $NS_1$ for the first time finishing process II, current densities $ip_1$ and $ip_2$ and pulse durations $P_1$ and $P_2$ for processes I and II respectively. At a step 103, the finishing process shown in FIG. 6 is repeated NF times. In the first routine, after the finishing process I, the program jumps from step 104 to step 110 where the removing pulse current is changed to the finish pulse current to perform the finishing process II. When the machining is repeated a predetermined number of times $NS_1$ for the process II, the program returns to the step 103 where the process I is performed, thereby removing the oxide film. Since it is determined at the step 104 that the present routine is not the first routine, the program goes to a step 105 where the cut depth $\Delta di$ is measured.

Figure 15:
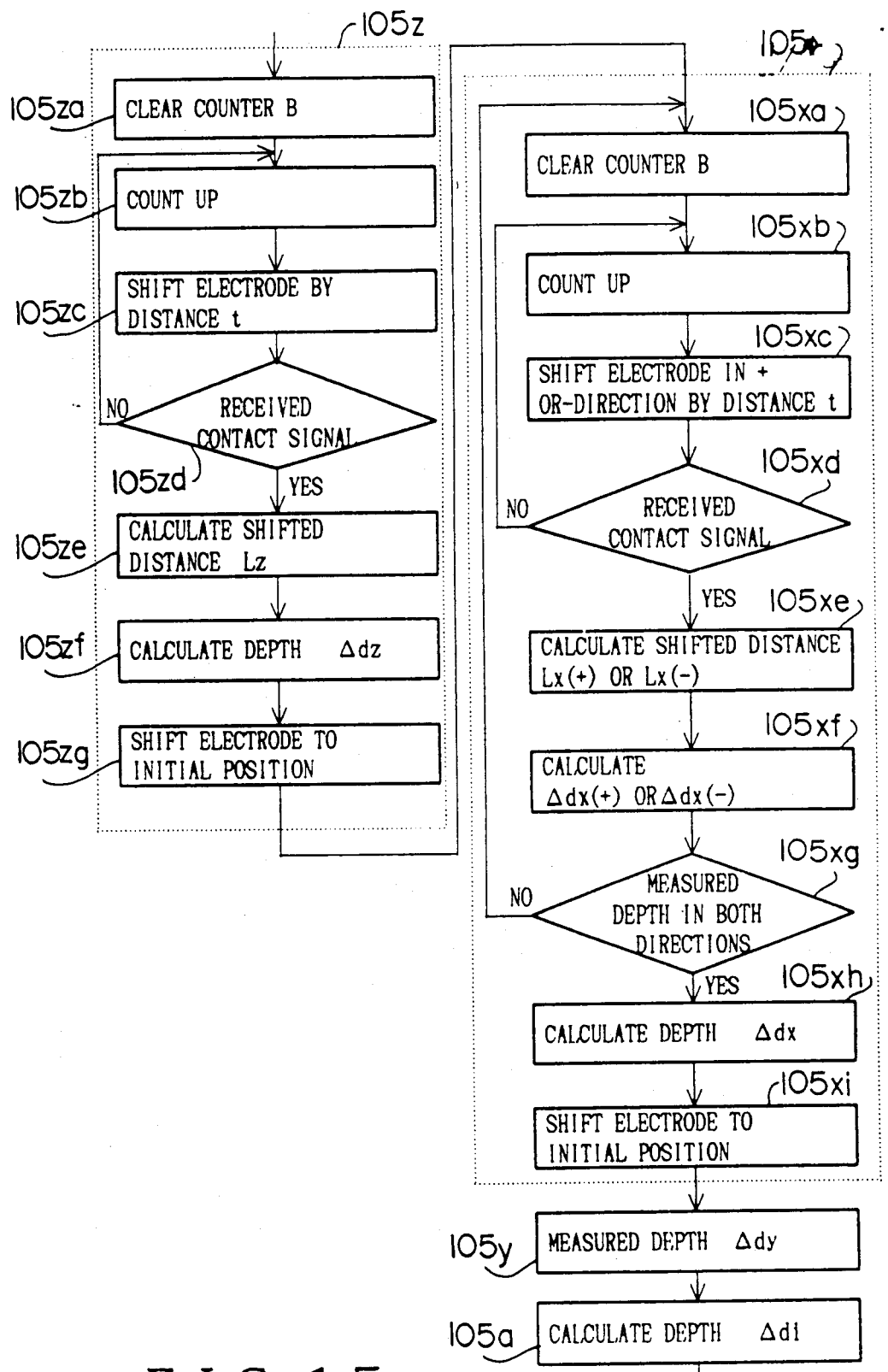
FIG. 15 is a flowchart showing a process of measuring a cut depth in the sixth embodiment.
Figure 16:
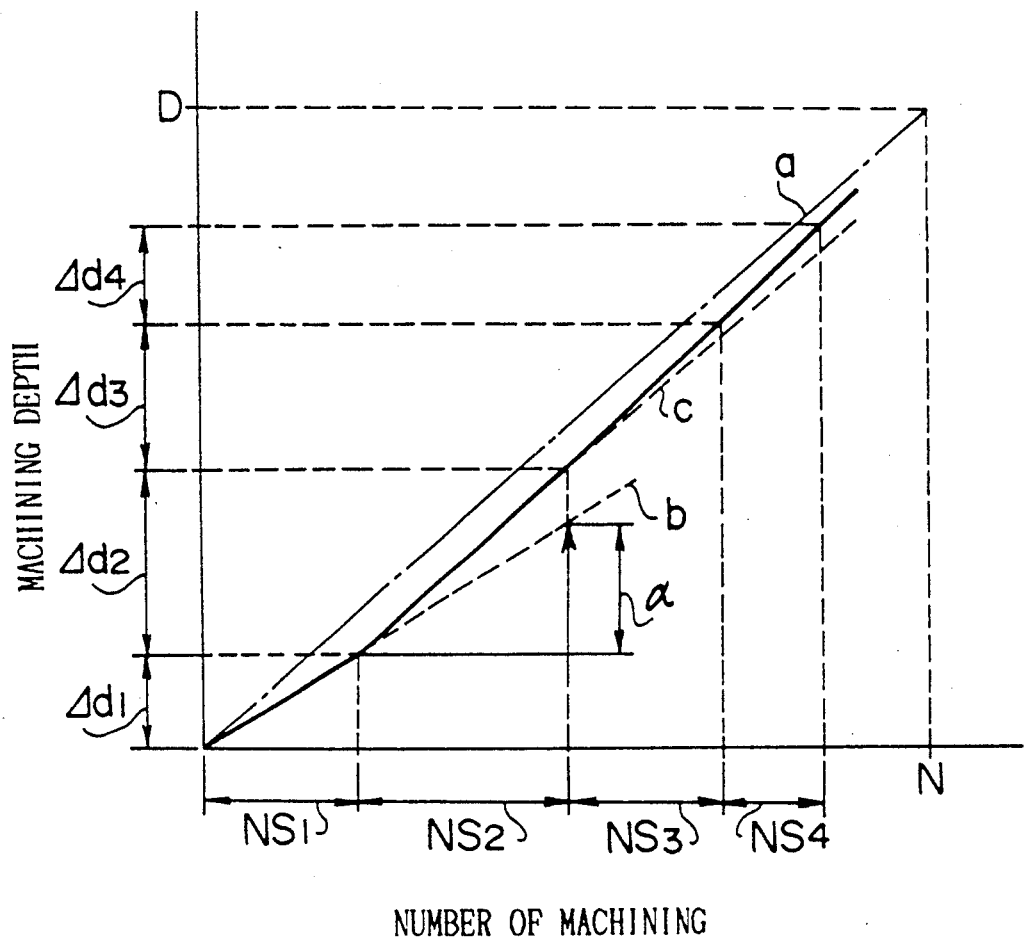
FIG. 16 is a graph showing the relationship between the number of machining passes and the cut depth in the sixth embodiment.

As shown in FIG. 15, the process for measuring the depth $\Delta di$ is similar to that shown in FIG. 12. Steps 105z, 105x and 105y are steps for measuring the cut depth $\Delta dz$ on Z-axis, the depth $\Delta dx$ on X-axis and the depth $\Delta dy$ on Y-axis of a coordinate system, respectively. The origin O, having coordinates (0, 0, 0), of the coordinate system is positioned at a certain reference point R at the lower end of the electrode 2 whereby the gap $\delta$ is maintained. In the step 105z, the descent of the electrode 2 by the distance t such as 1 $\mu$m is repeated until the electrode 2 and the workpiece 4 make contact with each other (steps 105za to 105zd) as in the previously described embodiment. At a step 105ze, a shifted distance Lz of the electrode 2 is calculated as follows.

$$Lz = Cb \times t$$

where Cb is a count of the counter B. The cut depth $\Delta dz$ on the Z-axis is calculated based on the shifted distance Lz as follows.

$$\Delta dz = Lz - \delta$$

The reference point R of the electrode 2 returns to the initial position at the origin O.

Thereafter, the program goes to the step 105x to measure the depth Δdx in the X-axis direction. The counter B is cleared (step 105xa) and the count Cb is started (step 105xb). The electrode 2 is shifted in a positive direction (+) along the X-axis, and a shifted distance Lx(+) is calculated at steps 105Xc to 105Xe in the same manner as the steps 105zc to 105ze. At the next step (step 105xf), the depth Δdx(+) is calculated dependent on the quantity Lx(+). When it is determined, at the step 105xg, that the cut depth in the X-axis direction has been obtained, the program returns to the step 105xa to measure the quantity Lx(−) and the depth dx(−) in the negative direction. After both depths Δdx(+) and Δdx(−) are calculated, the cut depth Δdx is calculated by the following equation.

$$\Delta dx = (\Delta dx(+) + \Delta dx(-))/2$$

its electrode 2 is thereafter shifted to the initial position (step 105xi).

The step 105y for calculating the cut depth Δdy on Y-axis is virtually the same as the step 105x so that the explanation thereof is omitted.

When all three depths Δdx, Δdy and Δdz are calculated, the depth Δdi is calculated at a step 105a as follows.

$$\Delta di = (\Delta dz + \Delta dx + \Delta dy)/3$$

A total cut depth d is calculated at a step 106 by adding the cut depth Δdi at every routine. The total machining depth d is compared with the designated depth D to determine whether the depth d is within a predetermined range r with respect to the machining depth D ($d = D + r$) at a step 107. When the difference between the total cut depth d and the machining depth D is larger than the value r, the program proceeds to a step 108. At the step 108, number of machining passes $NS_2$ for obtaining the a predetermined depth α (FIG. 16), for example 10 μm, during the second time of carrying out the machining process II, is calculated based on the actual depth of cut Δdi as follows.

$$NS_2 = \alpha \times NS_1/\Delta di$$

At (i+1)th time, $NS_{i+1}$ is $$NS_{i+1} = \alpha \times NS_1/\Delta di$$

The calculated number of machining passes $NS_i$ is set at a step 109 so that the machining process II is again carried out, feeding pulse current $NS_i$ times at the step 110. The program then returns to the step 103 for the machining process I to apply the removing pulse current. The machining process is finished (step 111) when the total d of the machining depth Δdi is in the range of D±r after repeating the steps 103 to 110. Thus, the workpiece 4 is machined along solid parts of lines b and c in FIG. 16. Since the oxide film is removed after each machining process II, the machining depth can be accurately measured with the contact detector.

Figure 17:
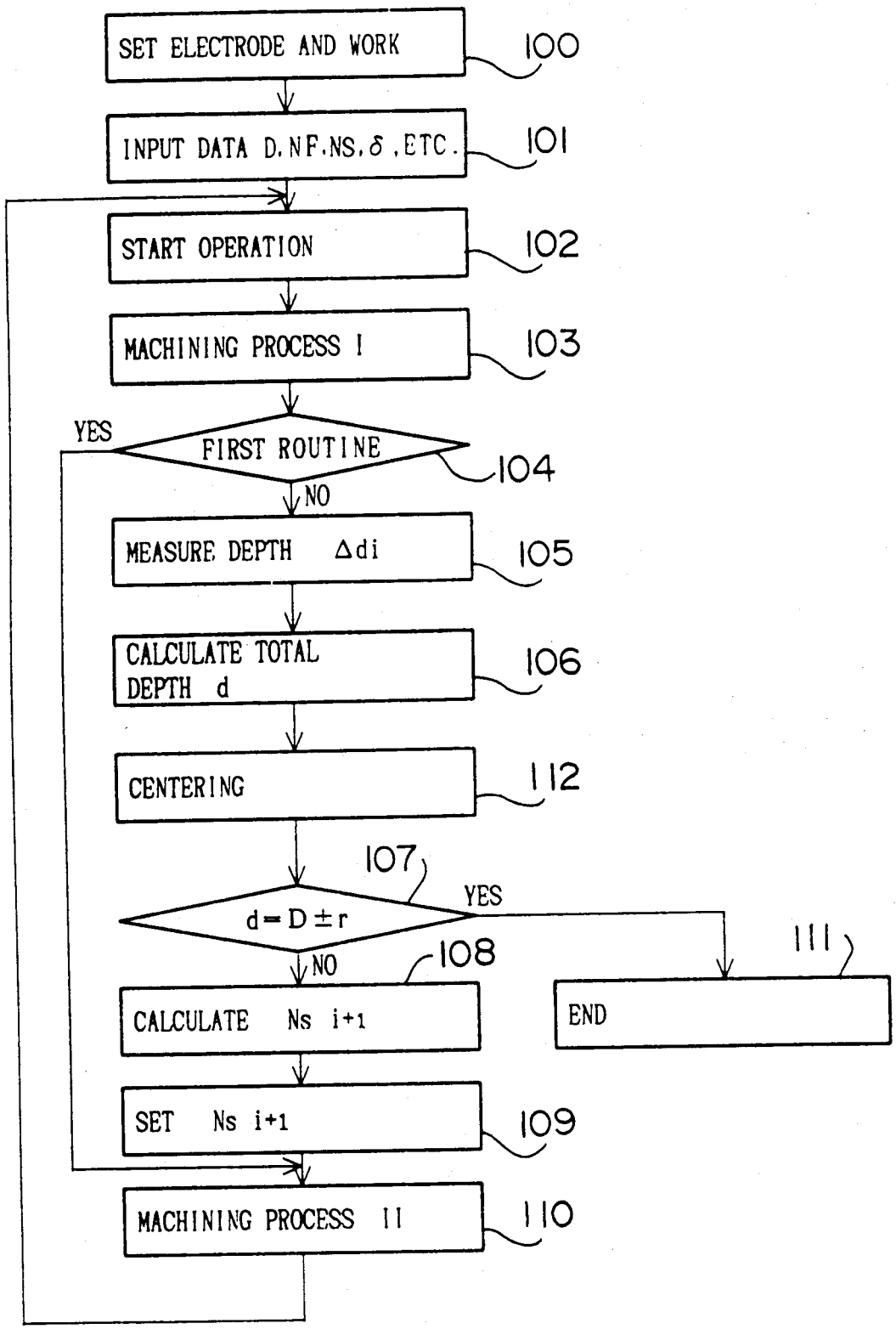
FIG. 17 is a flowchart showing the operation of a seventh embodiment of the present invention.
Figure 18:
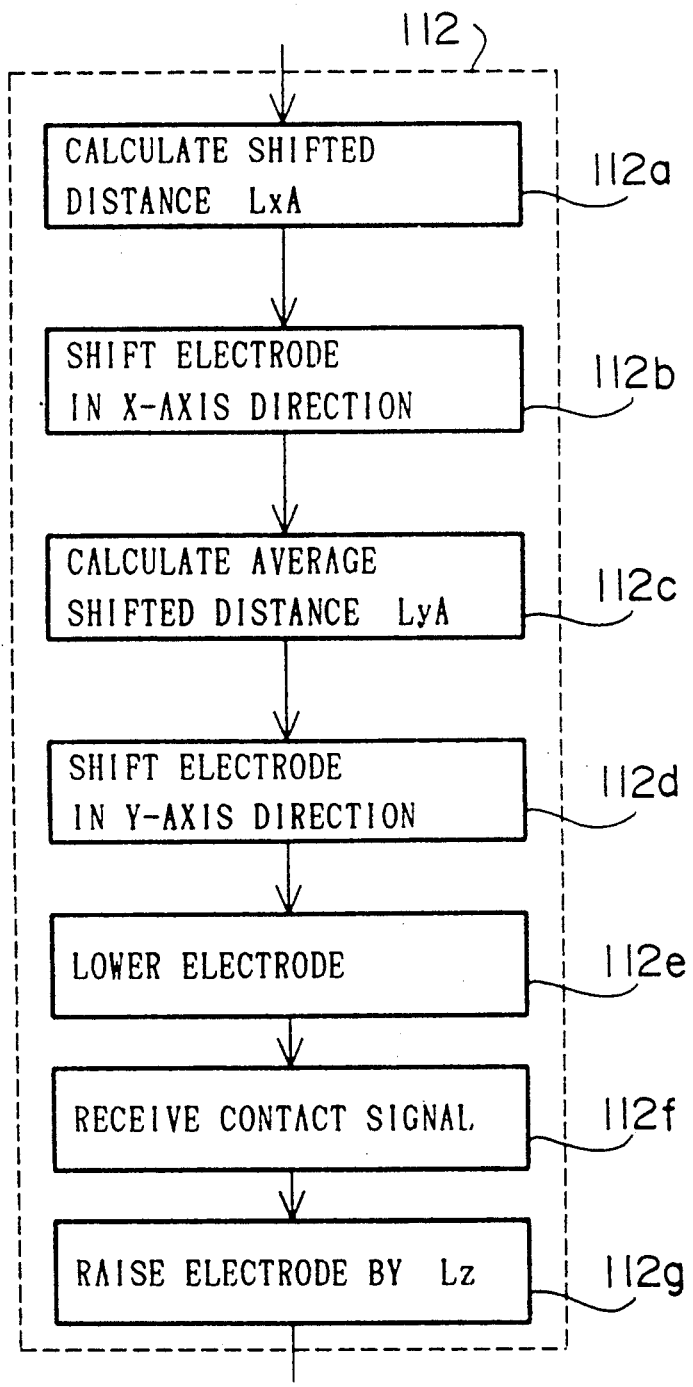
FIG. 18 is a flowchart showing a centering process in the machining method of the seventh embodiment.

FIGS. 17 and 18 show flowcharts of a seventh embodiment of the present invention, which is similar to the sixth embodiment. In the seventh embodiment, the centering of the electrode 2 with respect to the workpiece 4 is performed at a step 112 after the total machining depth d is calculated at the step 106. As a result, the electrode 2, which was shifted at the step 105 when measuring the depth Δdi, can be positioned more accurately for the machining process II.

An example of the centering process is hereinafter described in detail with reference to FIG. 18. At a step 112a, an average shifted distance LxA in the X-axis direction is calculated in accordance with the following equation.

$$LxA = (Lx(+) + Lx(-))/2$$

where Lx(+) and Lx(−) are shifted distances calculated at the step 105xe (FIG. 15). The electrode is shifted by distance LxA accordingly along the X-axis at a step 112b. So that the x coordinate of the reference point of the electrode 2 becomes zero. The same procedure is performed for adjusting the electrode 2 on the Y-axis. Namely, an average shifted distance LyA is calculated (step 112c) and the electrode 2 is shifted accordingly (step 112d). In order to adjust the vertical position of the electrode 2, that is, in the Z-axis direction, the electrode 2 is lowered (step 112e) until it makes a contact with the workpiece 4 (step 112f). Thereafter, the electrode 2 is raised a distance Lz obtained at the step 105ze (FIG. 15). Thus, the dimension of the gap 17 is kept constant at any point of the work surface so that an uniform depth can be formed on the work 4.

The steps 112a to 112g may be repeated a predetermined number of times. The centering process may further be modified to shift the electrode along the X-axis and the Y-axis in each of the (+) and (−) directions until the electrode 2 contacts the workpiece 4, and the electrode 2 is shifted the half of the shifted distance in the X- and Y-axes directions. Alternatively, the centering may be carried out only in X-and Y-axes directions, or a centering direction, such as rotational direction about the Z-axis, may be added.

In the present embodiment, the centering process enables the maintenance of the dimension between the electrode 2 and the workpiece 4 constant so that the depth across the whole surface of the workpiece 4 can be uniform.

Referring to FIG. 19, an eighth embodiment of the present invention is characterized in that the workpiece 4 is prevented from being machined more than a predetermined number of times at each machining process II.

The electrode 2 and the workpiece 4 are set (step 120) and the data are input (step 121). The data in the present embodiment include designated machining depth D, number of machining passes NF for the machining process I and $NS_1$ for the machining process II-1(primary), respectively, maximum number of machining passes NSmax, which is the maximum number of machining passes in the machining process II-2 (secondary) at a step 133, and the initial dimension δ of the gap 17. The maximum machining number of passes NSmax is the number of machining passes allowed to machine at one machining process II-2. In addition, the number of repetitions Nr of the machining process II-2 is initialized, that is, set to zero.

When the operation is started (step 122), the machining processes I and II are consecutively performed, followed by an additional machining process I (steps 123 to 125). A value nr is calculated by subtracting 1 from the number of repetition Nr (step 126). In the first routine, since the value of Nr is zero, the value nr is −1. Thus, it is determined at a step 127 that nr is smaller than zero. The cut depth Δdi is measured and the total depth d is calculated in the afore-described manner at steps 128 and 129. When the total depth d is not in the range of D±r (step 130), the program goes to a step 131 wherein the number of machining passes $NS_{i+1}$ for (i+1)th is calculated. Furthermore, the number of repetitions Nr and a remainder $NS_{i+1}'$ are calculated based on the number of machining passes $NS_{i+1}'$ and the maximum number of passes NSmax at the step 131. Namely, since the workpiece 4 can only be machined NSmax times at the most at each of the machining process II-2, the machining number of passes $NS_{i+1}$ is divided by the maximum number of times NSmax to obtain the repeating number Nr and the remainder $NS_{i+1}'$, as follows.

$$NS_{i+1}/NSmax = Nr \text{ rem. } NS_{i+1}$$

For example, when the maximum machining passes NSmax is 50 and the calculated machining passes $NS_{i+1}$ is 120, 50 is divided into 120, giving quotient 2 and remainder 20. This means that in order to obtain the machining depth ΔD, the machining process II-2 is repeated twice, machining the workpiece 4 50 times each, followed by an additional machining process II-2 where the workpiece 4 is machined 20 times.

At a step 132, the numbers $NS_{i+1}$, $NS_{i+1}'$ and Nr are set so that the machining process II-2 is machined NSmax (50 times), at a step 133. The program then returns to the step 125 for the machining process I, thereby removing oxide film formed by the machining process II-2. Since the repeating number Nr is 2 at the present routine, the value nr calculated at the step 126 is 1. The program consequently proceeds from the step 127 to a step 134 where it is determined that the value nr is zero. Since nr is 1, the program goes to a step 135 where Nr is changed to Nr-1. Further, the machining process II-2 is carried out NSmax times (step 133) for the second time.

The program again returns to the step 125 and further to the step 126. Since the repeating number Nr is now one, the value nr is zero so that the program goes to a step 136 through the steps 127 and 134. At the step 136, the number of machining passes for the machining process II-2 is set to the remainder $NS_{i+1}'$, that is, 20 which is calculated at the step 131. Thus, in the third machining process II-2 at the step 133, the workpiece 4 is machined 20 times. As a result, the number of machining passes becomes $NS_{i+1}$(120) as calculated.

Thereafter, the program goes to the step 125. The repeating times Nr is zero and hence nr is −1, so that the program further proceeds to the step 128 where the cut depth Δdi as a result of the number of machining passes $NS_{i+1}$ is measured. If the total depth d is within the range of D±r (step 130), the machining is completed (step 137). When the total is smaller than D by the value r, the whole procedure is repeated.

Taking into account the oxide film and the eroded metal removed during the course of the machining process I, experiments have shown that the maximum number of machining passes NSmax is preferably 25 to 60.

In the present embodiment, the process I is necessarily performed after the process II-2. Thus, machining efficiency and accuracy are improved by maintaining the thickness of the oxide film on the work and the quantity of particles of eroded metal in the gap 17 under certain levels.

Figure 20:
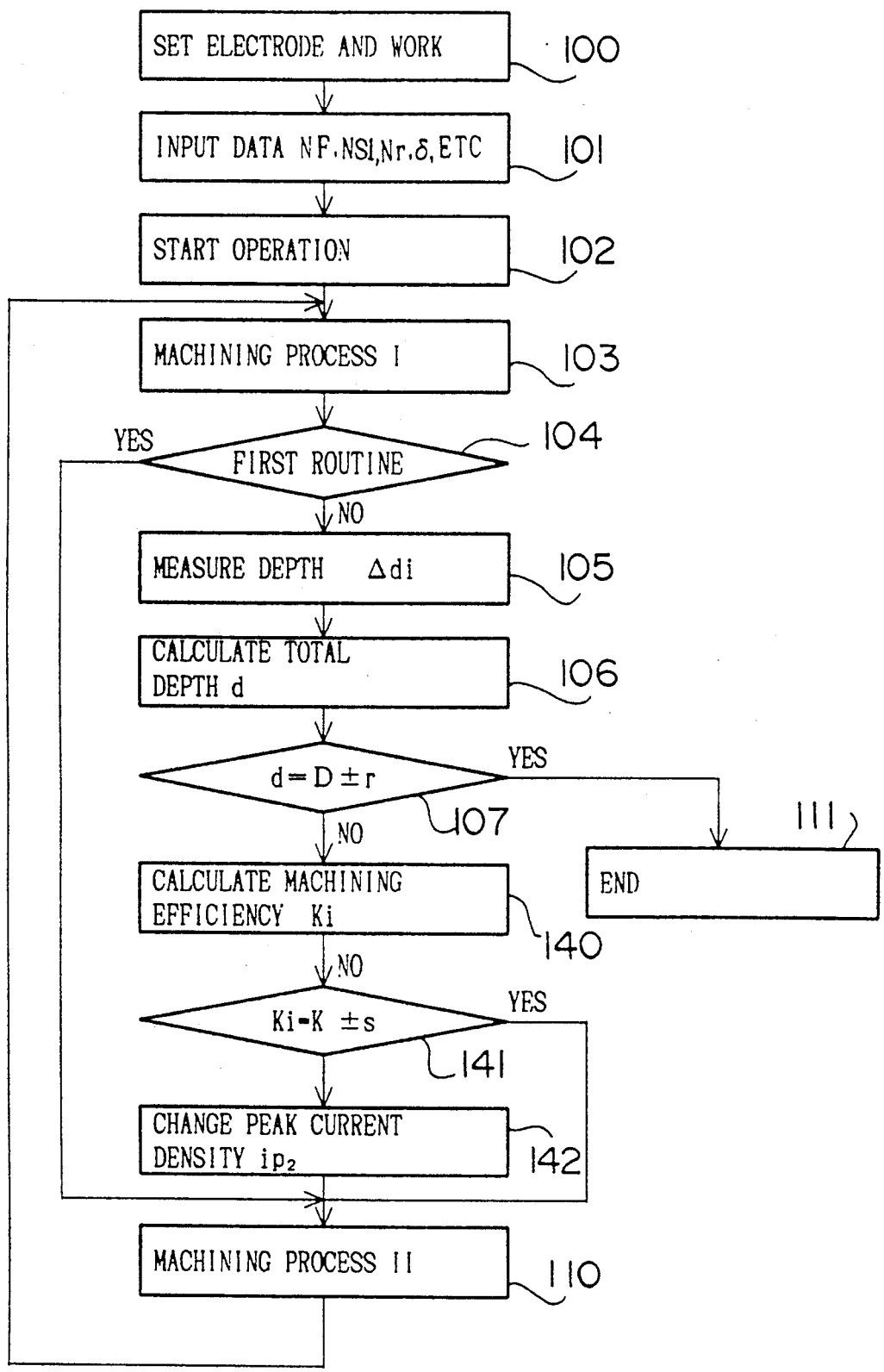

The ninth embodiment shown in FIG. 20 is different from the afore-described embodiments in that the machining depth is adjusted, not by changing the number of machining passes but by changing the peak current density ip. The embodiment is similar to the sixth embodiment shown in FIG. 14 and the same steps in both embodiments are designated by the same reference numerals.

After the machining process I and II are finished (steps 103, 110) in the first routine, the cut depth Δdi is measured through the process shown in FIG. 15 (step 105). When the total depth d of the depths Δdi calculated at the step 106 is not within the predetermined range D±r, (step 107), the program goes to a step 140 where a machining efficiency Ki is calculated as follows.

$$Ki = d/NSi$$

At a step 141, it is determined whether the machining efficiency Ki is within a range of K±s, where K is a desired machining efficiency calculated based on the designated machining passes depth D and the predetermined number of machining N(K=D/N) and s is a predetermined value.

Figure 21:
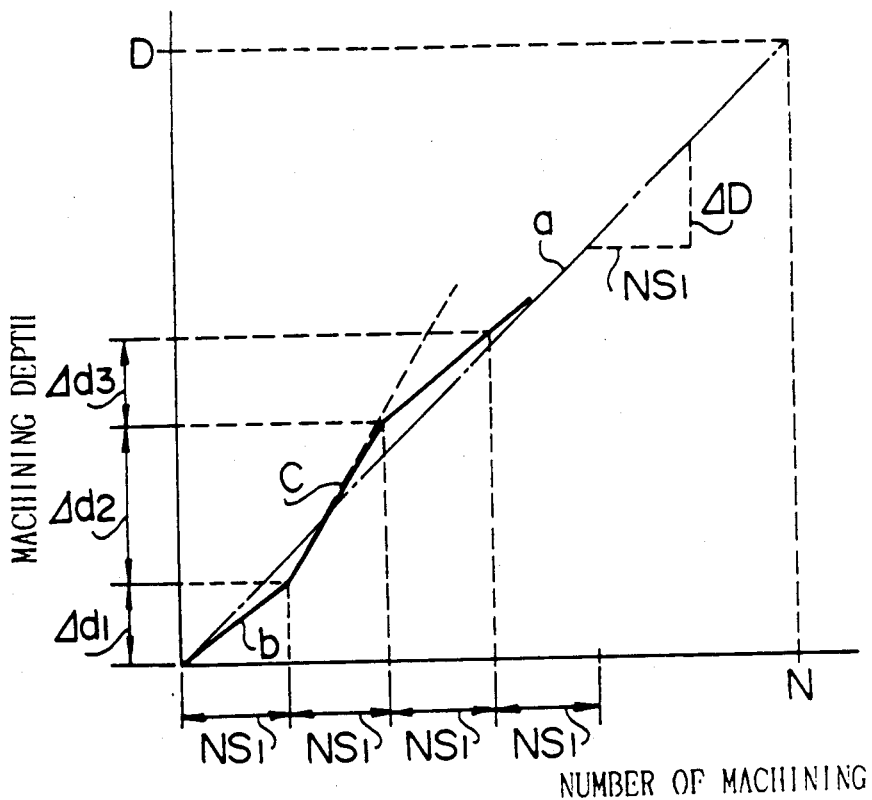
FIG. 21 is a graph showing the relationship between the number of machining passes and the cut depth in the ninth embodiment.

Referring to FIG. 21, lines a and b represent the desired machining efficiency K and the actual efficiency Ki, respectively When the actual machining efficiency Ki is in the predetermined range, the machining process II is performed with the pulse current having the same peak current density $ip_2$. However, when the actual efficiency largely deviates from the efficiency K, the program goes to aa step 142 for changing the density $ip_2$. Namely, when the actual efficiency Ki is larger than K+s, the CPU 40 applies a signal to the charge voltage setting section 36 of the machining condition control section 10 to increase the charge voltage, thereby decreasing the peak current density. To the contrary, when the actual efficiency Ki is smaller than K-s, the set voltage is decreased so as to increase the peak density. The efficiency Ki at the next step (step 110) is changed accordingly. For example, when the actual efficiency is smaller than K as shown by the line b, the peak current density is increased to increase the machining efficiency as shown by a line c in FIG. 21. The other operations are the same as in the sixth embodiment.

Thus in accordance with the present embodiment, although the surface area of the recess 4a of the workpiece 4 may not be accurately calculated, the actual machining efficiency is calculated to correct the peak current density appropriate for the actual surface area.

Figure 22:
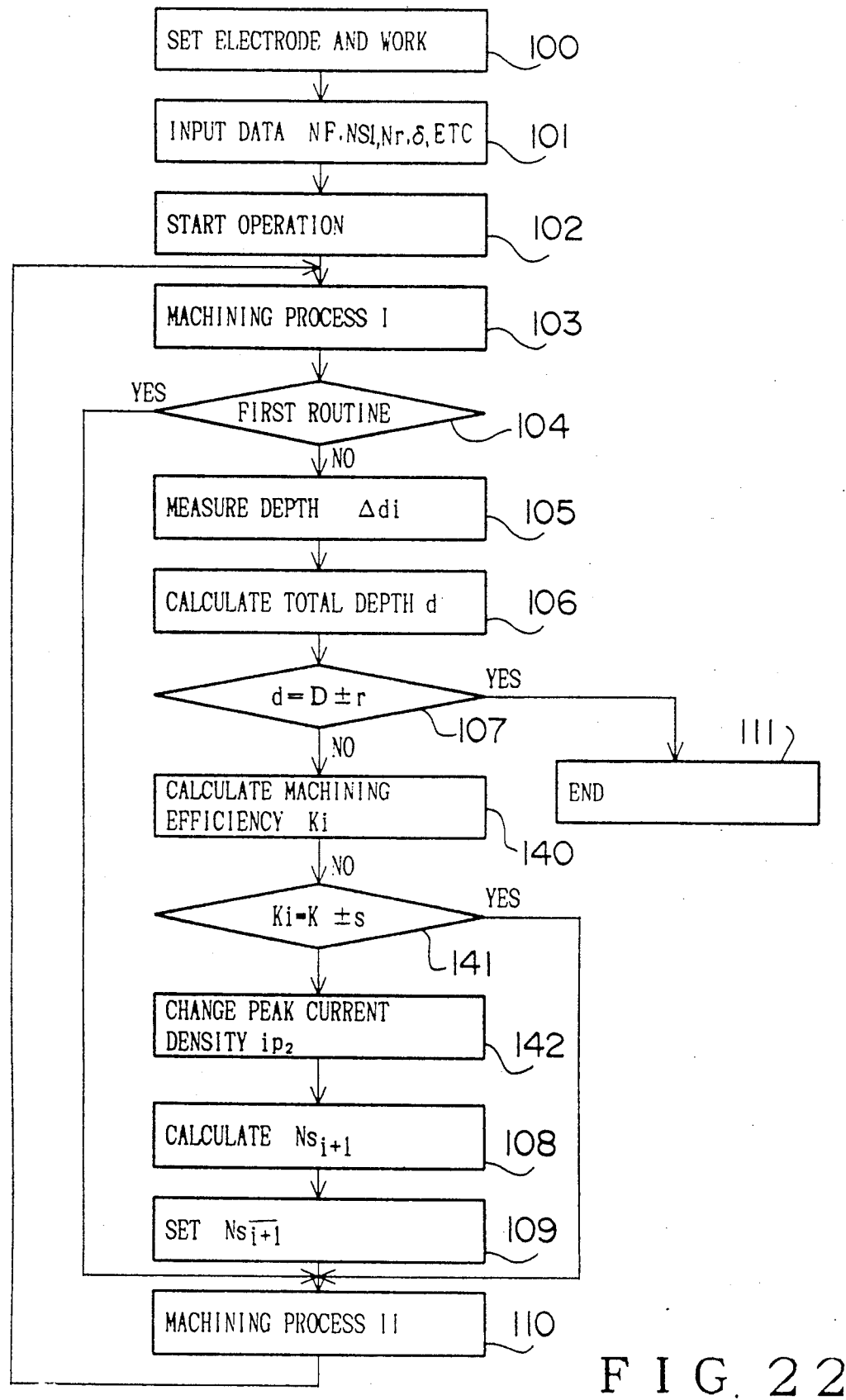
FIG. 22 is a flowchart showing the operation of a tenth embodiment of the present invention.

In a tenth embodiment of the present invention shown in FIG. 22, the machining depth is adjusted by changing the number of machining passes of the machining process II as well as the peak current density. Steps 100 to 142 and 110 are identical to the corresponding steps in the ninth embodiment of FIG. 20 and the steps 108 and 109 are identical to the corresponding steps in the sixth embodiment of FIG. 14. The value s in the present embodiment is preferably 50% of the efficiency K.

Figure 23:
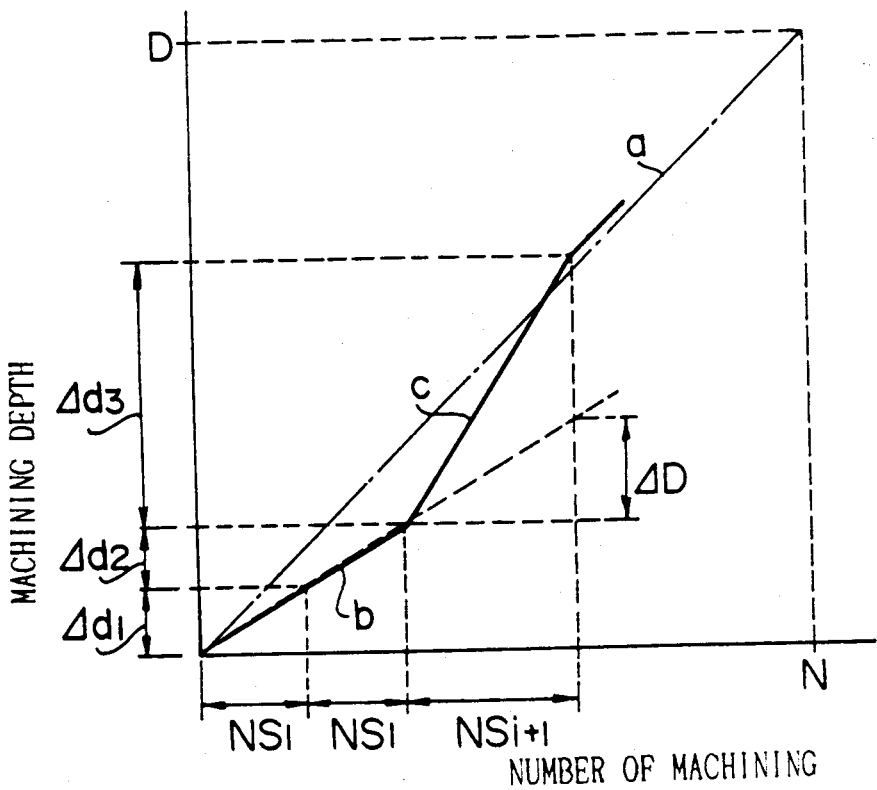
FIG. 23 is a graph showing the relationship between the number of machining passes and the cut depth in the tenth embodiment.

After the peak current density $ip_2$ is changed (step 142) in the afore-described manner, the number of machining passes $NS_{i+1}$ is calculated at the step 108. The number of machining passes $NS_{i+1}$ is a value required to obtain the predetermined depth ΔD (FIG. 23) if the pulse current having the same peak current density as in the first machining process II the step 110 is applied. As shown in the graph of FIG. 23, number of machining passes $NS_{i+1}$ is calculated in the same manner as in the sixth embodiment based on the predetermined depth $\Delta D$, predetermined number of machining passes NS and the actual cut depth $\Delta d1$ obtained by machining NS times as follows.

$$NS_{i+1} = \Delta D \times NS \Delta d2$$

Thus, the work is machined $NS_{i+1}$ times in the next machining process II. The other operations are the same as in the ninth embodiment.

In the present embodiment, the number of machining passes and the peak current density are both controlled so that the actual machining efficiency Ki approximates the desired machining efficiency K in a short time, thereby shortening the overall machining time.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for electrolytically finishing a workpiece including securing the work in a tank adapted to contain electrolyte, positioning an electrode to form a predetermined gap between the electrode and the surface of the work, supplying electrolyte to the tank so as to submerge the electrode and the work, applying pulses to the electrode, supplying clean electrolyte to the gap sufficient to remove debris therefrom, and discharging the electrolyte including residual products, the method comprising:
    setting a predetermined machining depth;
    setting a first theoretical number of machining passes necessary for obtaining the predetermined machining depth;
    performing a first number of machining passes on the workpiece;
    measuring a cut depth machined on the surface of the workpiece after performing said first actual number of machining passes;
    determining a second theoretical number of machining passes required to achieve said machining depth, based on the measured cut depth; and
    performing a second machining of the work based on the second theoretical number of machining passes sufficient to achieve said depth.

2. The method according to claim 1 wherein said first number of machining passes is equal to said first theoretical number of machining passes.

3. The method according to claim 1, wherein said first predetermined number of machining passes is less than the first theoretical number of machining passes.

4. A method of electrolytically finishing a workpiece to a desired depth including: securing the workpiece in a tank adapted to contain an electrolyte, positioning an electrode to form a predetermined gap between the electrode and the surface of the work, supplying electrolyte to the tank so as to submerge the electrode and the work, applying pulses to the electrode, supplying clean electrolyte to the gap, and discharing the electrolyte including residual products, the method comprising:
    setting a predetermined machining depth smaller than said desired machining depth;
    setting a first theoretical number of machining passes necessary for obtaining said predetermined machining depth;
    performing a first number of machining passes on the workpiece;
    measuring the depth of cut machined on the surface of the work after carrying out said first number of machining passes;
    from said measured depth of cut, determining a second theoretical number of machining passes necessary to achieve a desired machining depth; and
    performing second number of machining passes of the work based on said second theoretical number of machining passes.

5. A method for electrolytically finishing a workpiece including securing the workpiece in a tank adapted to contain electrolyte, positioning an electrode to form a predetermined gap between the electrode and the surface of the workpiece, supplying electrolyte to the tank so as to submerge the electrode and the work applying pulses to the electrode, supplying clean electrolyte to the gap, and discharging the electrolyte including residual products,
    the method comprising:
    setting a desired machining depth;
    setting a first number of machining passes necessary for providing a lustrous surface to said workpiece;
    setting a second number of machining passes necessary for improving the surface roughness of said workpiece;
    performing first number of machining passes on said workpiece;
    measuring the depth of the cut machined on the surface of said workpiece up on completion of said first number of machining passes;
    determining a second number of machining passes, based on the measured cut depth, necessary to achieve improvement of the roughness of the surface of said workpiece; and
    performing said second number of machining passes on said workpiece.

6. The method according to claim 5 wherein said second number of machining passes includes a maximum number of machining passes.

7. A method for electrolytically finishing a workpiece including securing the workpiece in a tank adapted to contain an electrolyte, positioning an electrode to form a predetermined gap between the electrode and the surface of the workpiece, supplying electrolyte to the tank so as to submerge the electrode and the work, applying pulses to the electrode, supplying clean electrolyte to the gap, and discharging the electrolyte including residual products, the method comprising:
    setting a desired machining depth;
    setting a first theoretical number of machining passes necessary for obtaining the desired machining depth;
    performing first predetermined number of machining passes on the workpiece;
    measuring a cut depth machined on the surface of the work after the actual number of machining passes reaches said predetermined number;
    calculating a machining efficiency based on said measured cut depth;
    comparing the calculated machining efficiency with a reference value;
    changing the current density of the pulses supplied to said electrode, based on the result of said comparison, to provide pulses having a corrected current density; and
    performing second machining of the workpiece with the pulses having the corrected current density sufficient to achieve said desired machining depth.

* * * * *